(12) United States Patent
Nalluri et al.

(10) Patent No.: US 9,729,399 B2
(45) Date of Patent: Aug. 8, 2017

(54) BANDWIDTH ON DEMAND AUTOMATION

(71) Applicant: Verizon Patent and Licensing Inc., Arlington, VA (US)

(72) Inventors: Sachindra K. Nalluri, Frisco, TX (US); Vinod Ramalingam, Irving, TX (US); Rui Deng Kirtzic, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 68 days.

(21) Appl. No.: 14/644,349

(22) Filed: Mar. 11, 2015

(65) Prior Publication Data

US 2016/0269244 A1   Sep. 15, 2016

(51) Int. Cl.
*H04L 12/24* (2006.01)
*H04L 12/26* (2006.01)

(52) U.S. Cl.
CPC .......... *H04L 41/0896* (2013.01); *H04L 41/22* (2013.01); *H04L 41/5054* (2013.01); *H04L 43/0876* (2013.01)

(58) Field of Classification Search
None
See application file for complete search history.

(56) References Cited

U.S. PATENT DOCUMENTS

| 7,421,499 B1 * | 9/2008 | Lanahan | H04L 12/2463 709/220 |
| 9,277,292 B2 * | 3/2016 | McCarthy | H04H 20/38 |
| 2011/0083154 A1 * | 4/2011 | Boersma | H04N 21/4334 725/109 |
| 2013/0014186 A1 * | 1/2013 | Thomas | G06F 3/0481 725/87 |

* cited by examiner

*Primary Examiner* — Christopher Crutchfield
*Assistant Examiner* — Tito Pham

(57) ABSTRACT

A device enables automated bandwidth on demand functionality for a user, associated with a network, based on a request of the user, and receives a particular schedule for the user and the automated bandwidth on demand functionality. The device generates provisioning commands that update bandwidth requirements of the network, for the user, based on the particular schedule. The device provides the provisioning commands to network resources of the network, and the provisioning commands cause the network resources to implement the updated bandwidth requirements for the user according to the particular schedule.

20 Claims, 17 Drawing Sheets

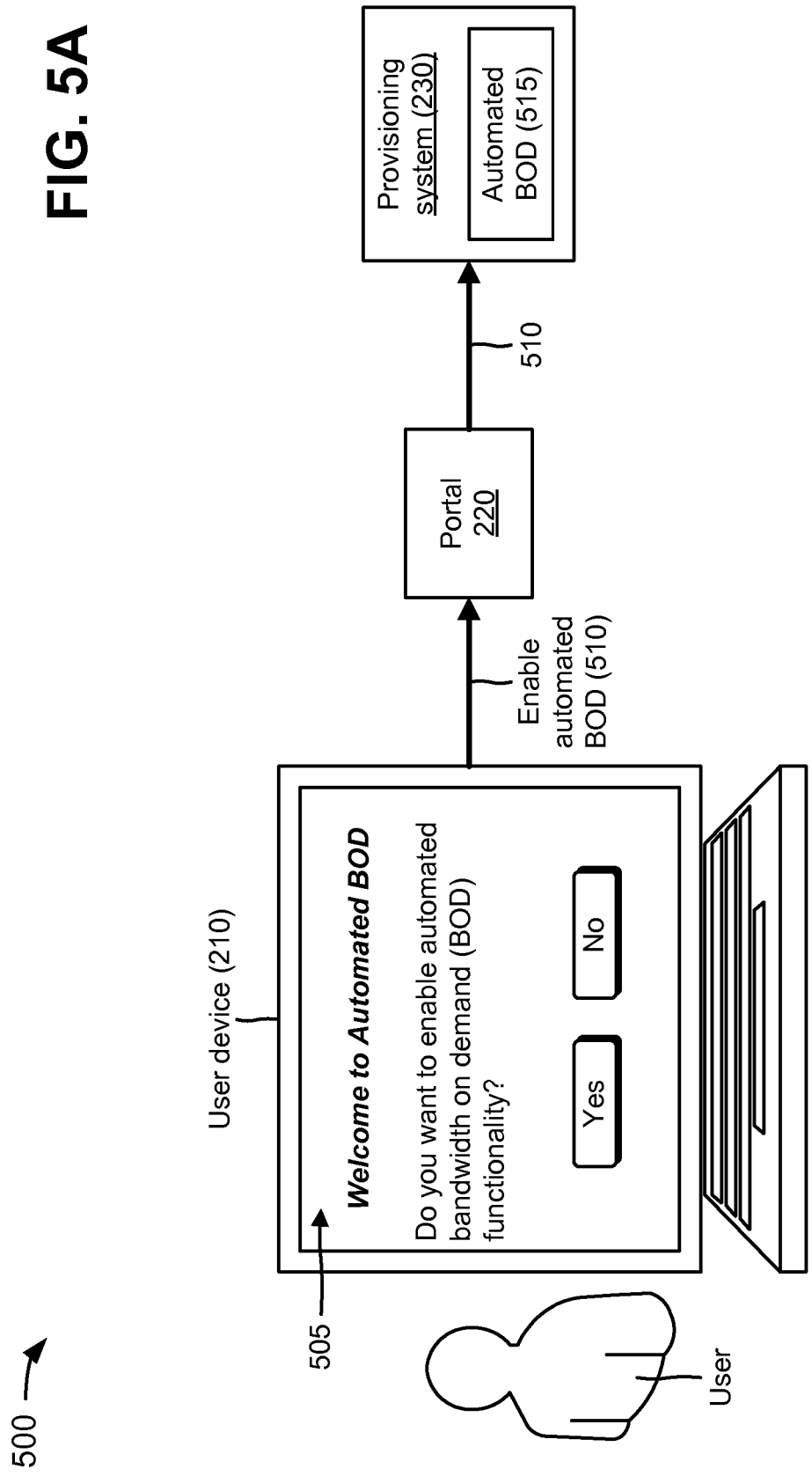

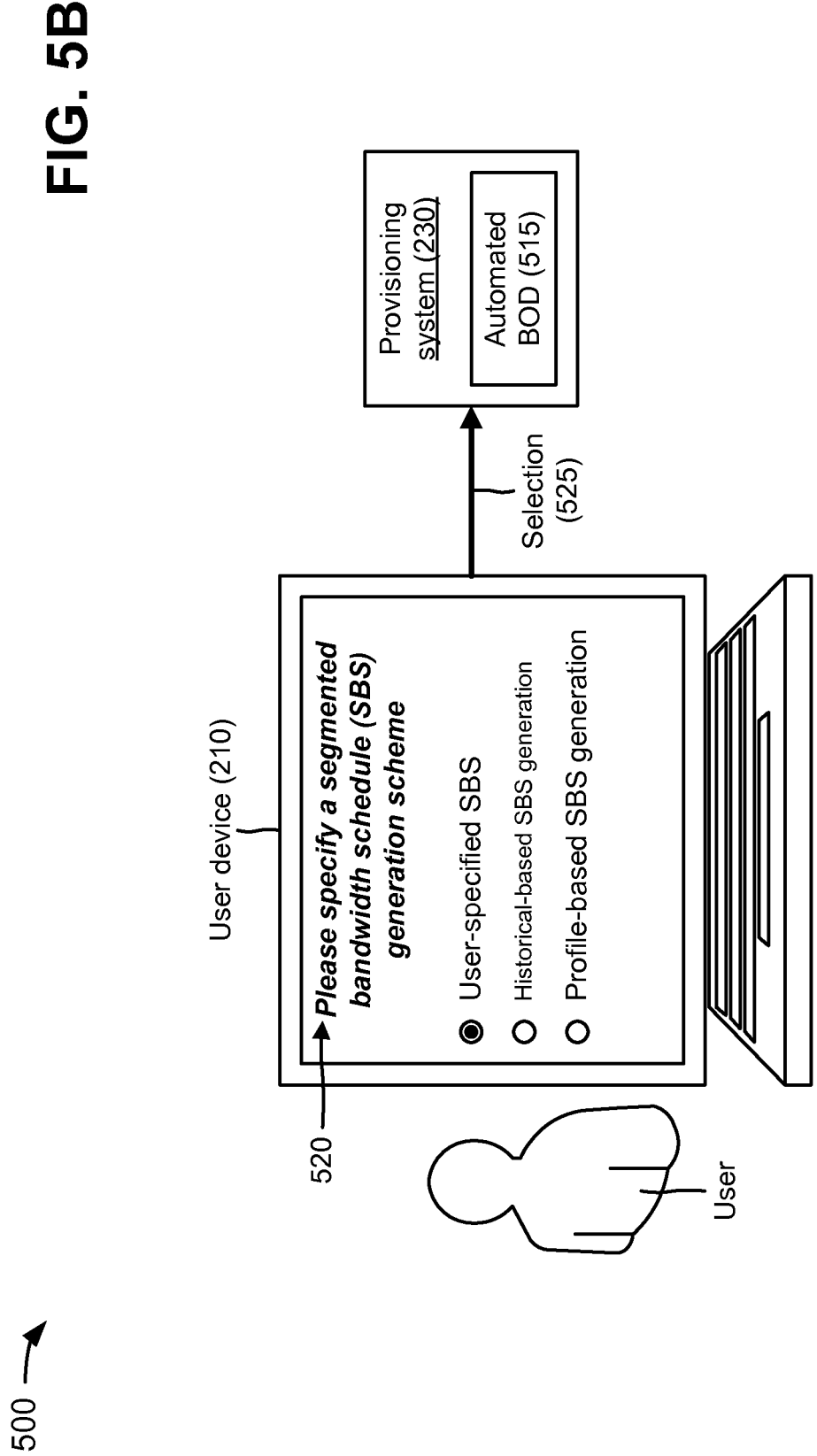

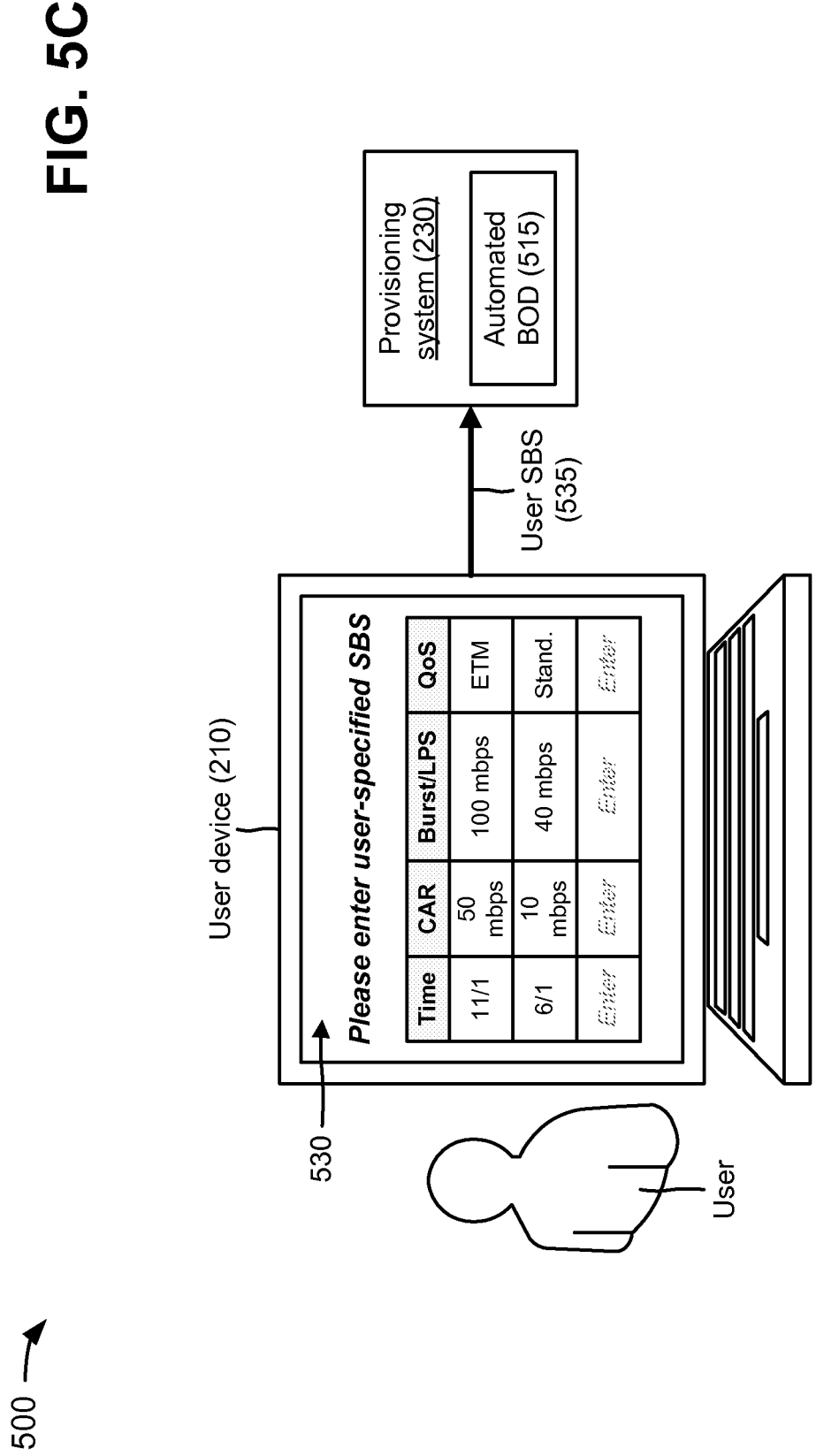

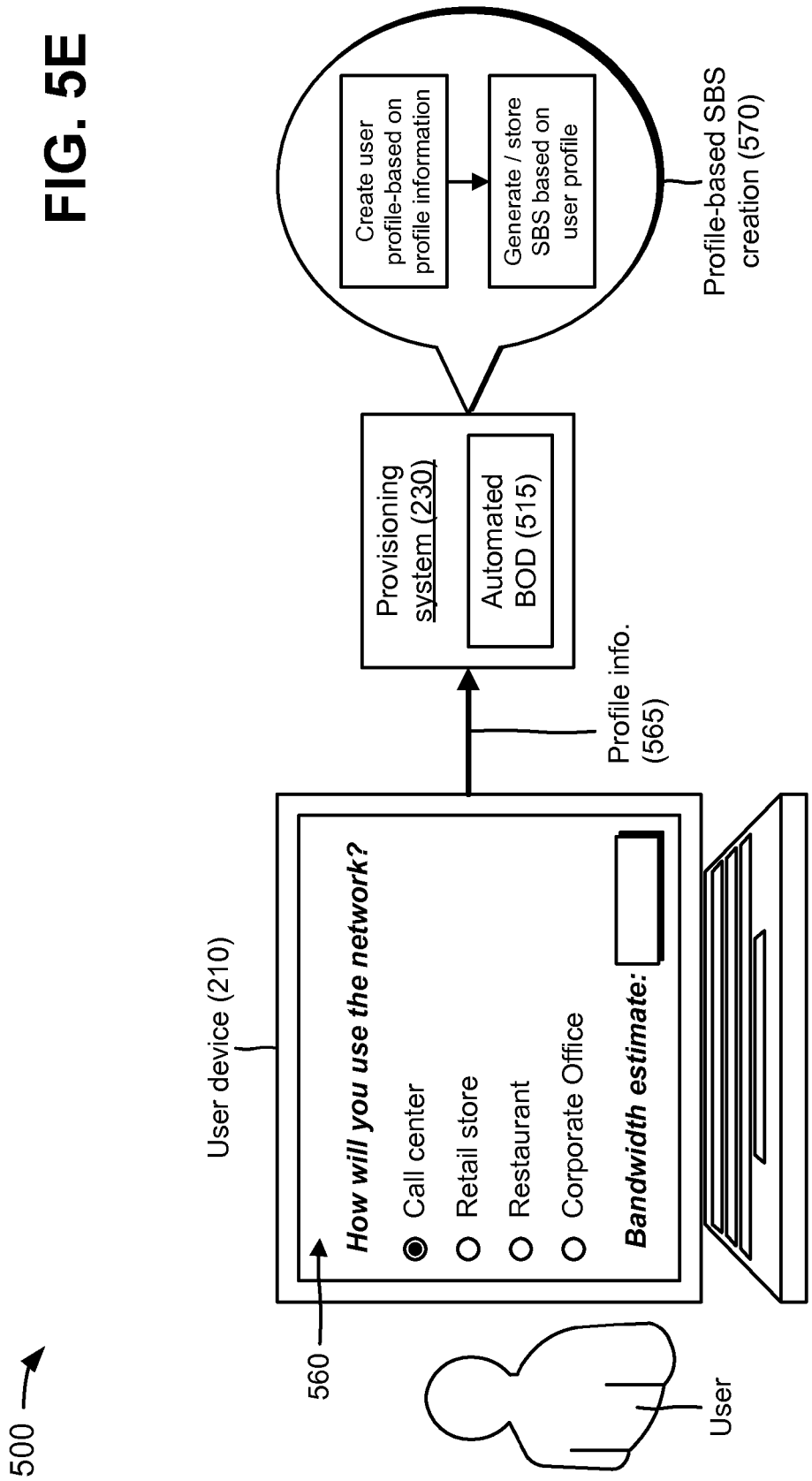

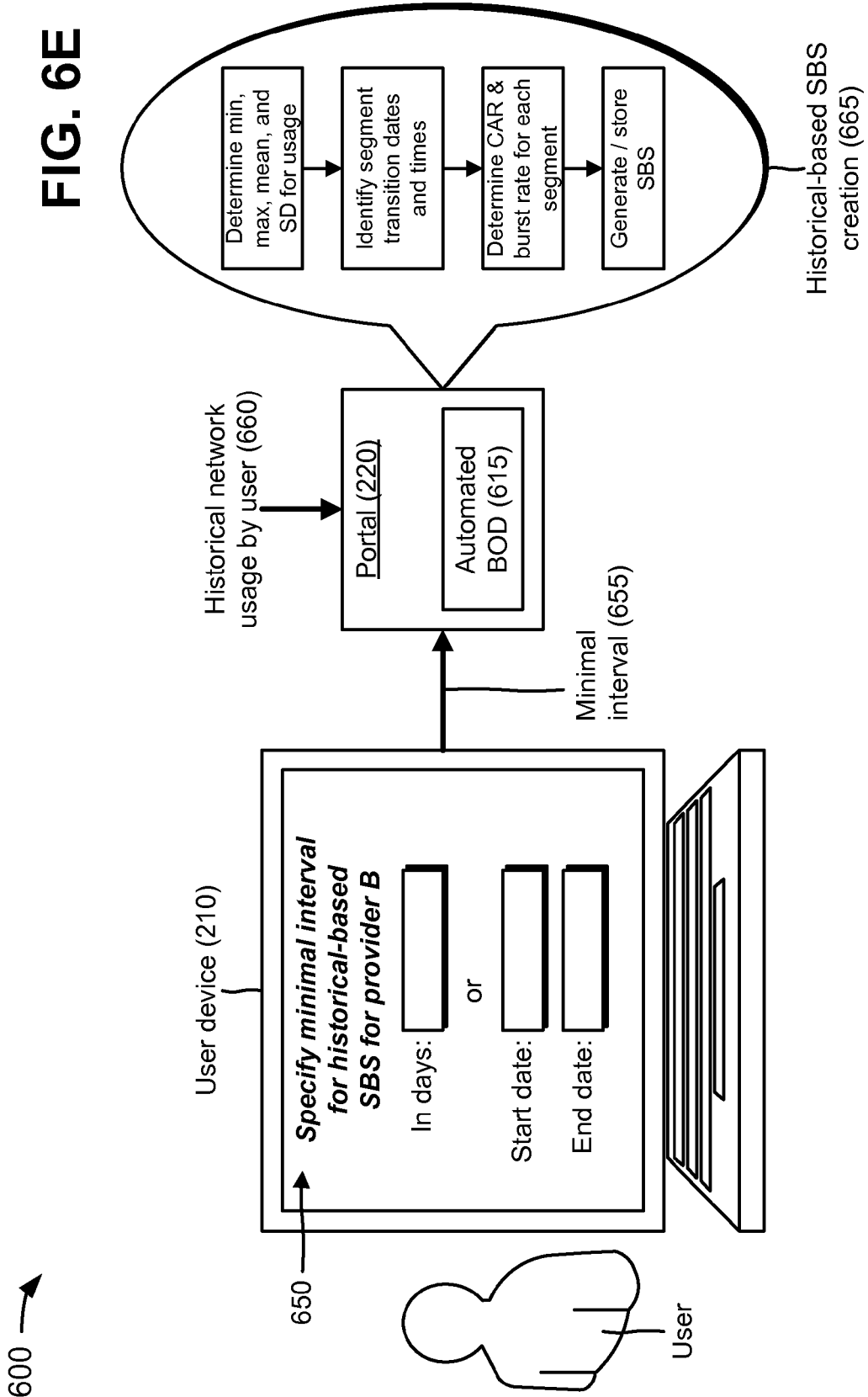

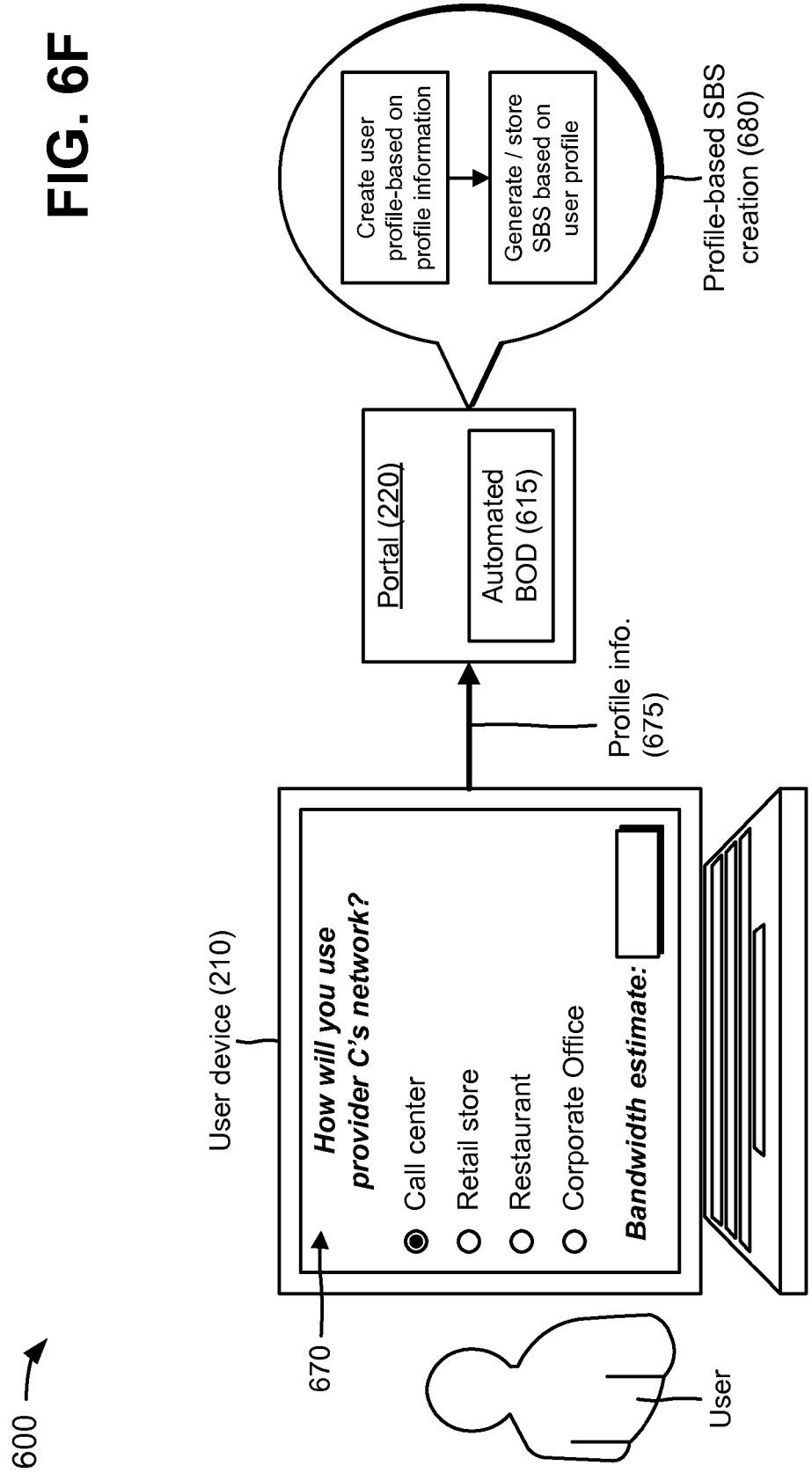

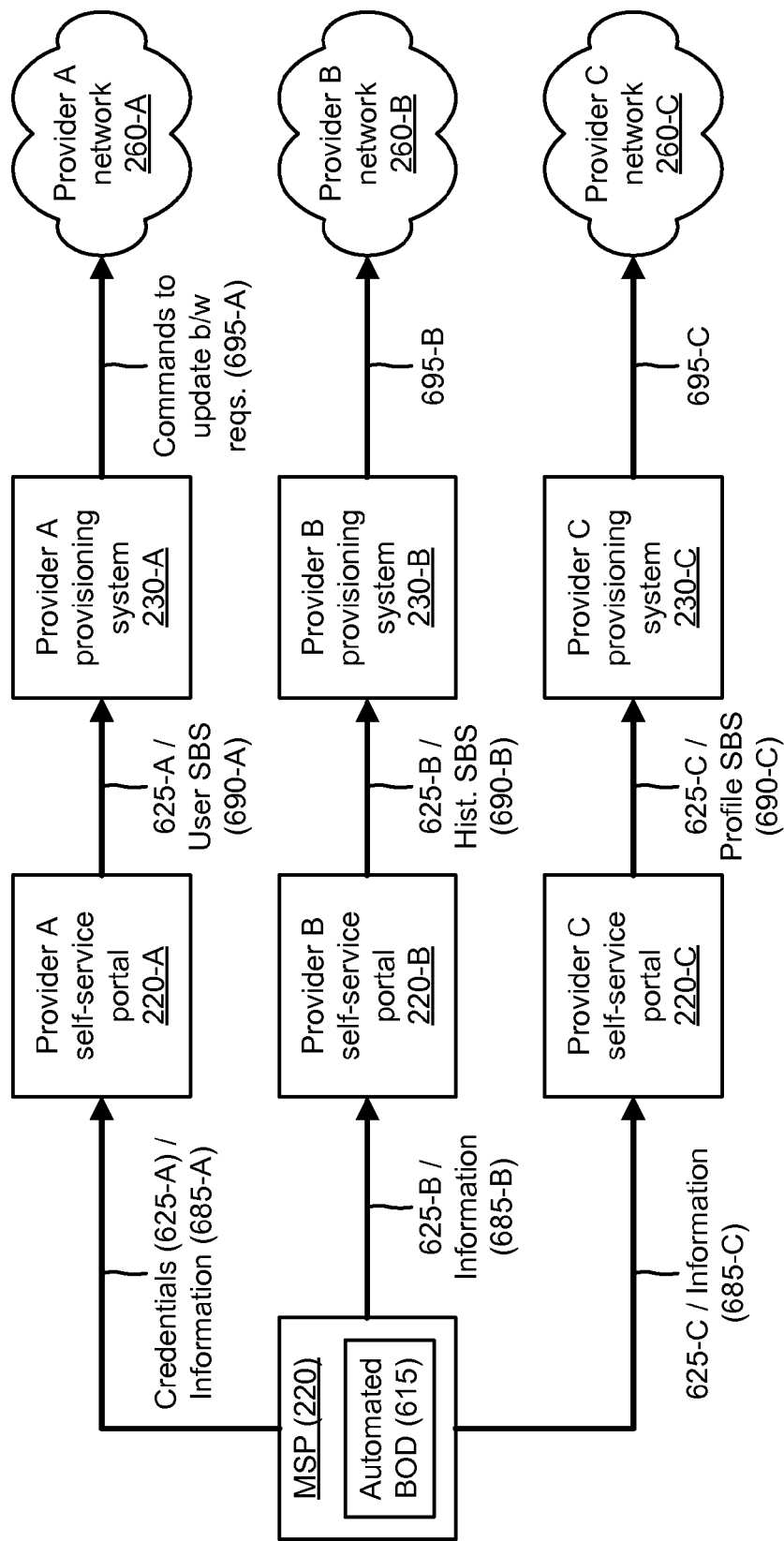

BANDWIDTH ON DEMAND AUTOMATION

BACKGROUND

Bandwidth requirements vary from network to network and from user to user. Determining how many bits per second travel across a network and an amount of bandwidth that each user utilizes are vital to building and maintaining a fast and functional network. Entities, such as network service providers, are constantly trying to estimate bandwidth requirements for users in order to ensure that a network will function properly. However, estimating bandwidth requirements for different users may be difficult for network service providers.

BRIEF DESCRIPTION OF THE DRAWINGS

FIGS. 5A-5F are diagrams of an example relating to the example process shown in FIG. 4; and FIGS. 6A-6G are diagrams of another example relating to the example process shown in FIG. 4.

DETAILED DESCRIPTION OF PREFERRED EMBODIMENTS

The following detailed description refers to the accompanying drawings. The same reference numbers in different drawings may identify the same or similar elements.

Network service providers may provide self-service portals that enable users (e.g., customers) to request and make bandwidth changes, quality of service (QoS) changes, or the like. Users may make such changes to adjust to seasonal needs (e.g., more bandwidth required during a holiday season), to keep communication costs reasonable (e.g., less bandwidth required during a less busy month), or to the like. The self-service portal may enable a user to initiate a dynamic bandwidth change request, and the request may be provided to a provisioning system. The provisioning system may send, to network resources (e.g., network devices, such as routers, service aggregators, firewalls, switches, or the like), commands that instruct the network resources to make the dynamic bandwidth change by updating a committed access rate (CAR), a logical port speed (LPS), or the like associated with the user.

However, since such self-service portals require user initiation and management, fewer and fewer users are utilizing the self-service portals to request and make bandwidth changes, QoS changes, or the like. A user that is not utilizing the self-service portal may use one standard bandwidth, which may not be an optimum bandwidth for the user (e.g., a bandwidth that does not meet the user's needs). On the other hand, the standard bandwidth may be a bandwidth that is too large for the user, which may result in higher than necessary network usage costs for the user. The standard bandwidth may be a bandwidth that is too small for the user, which may result in an irate user and potential lost business for the network service provider.

Systems and/or methods, described herein, may provide an automated bandwidth management process that enables a user to specify a bandwidth schedule one time, and that automatically implements the bandwidth schedule without further user intervention. The systems and/or methods may enable user to continue to make bandwidth changes from the self-service portal if desired, may automatically implement bandwidth changes for the users without further user intervention, and may provide cost savings to the user based on optimum bandwidth usage. The systems and/or methods may enable network service providers to save costs associated with manual bandwidth changes, to provide an improved user experience, and to minimize loss of unsatisfied users.

Figure 1:
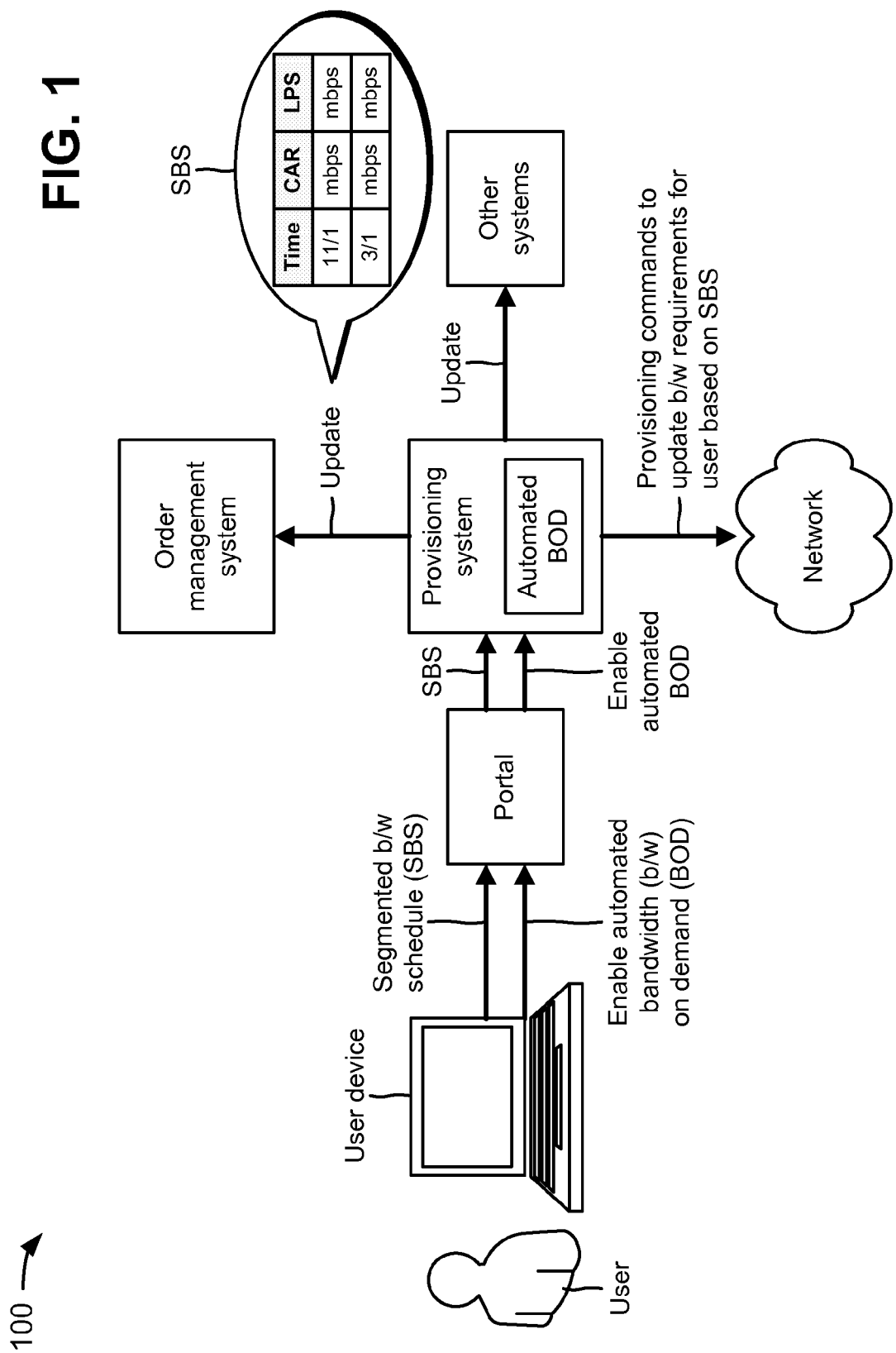
FIG. 1 is a diagram of an overview of an example implementation described herein.

FIG. 1 is a diagram of an overview of an example implementation 100 described herein. As shown, assume that a user (e.g., an entity) associated with a user device (e.g., a personal computer, a laptop computer, a smart phone, or the like) wishes to automatically manage bandwidth of a network that is allocated to the user. Further, assume that the network is associated with a provisioning system that configures network resources (e.g., network devices, such as routers, service aggregators, firewalls, switches, or the like) of the network to provide particular bandwidths, QoS, or the like, to particular users. The user may utilize the user device to provide, to a portal (e.g., a web portal), an instruction to enable automated bandwidth on demand (BOD) for the user. The portal may receive the instruction and may provide the instruction to the provisioning system. The provisioning system may receive the instruction, and may enable the automated bandwidth on demand for the user based on the instruction.

As further shown in FIG. 1, the user may utilize the user device to provide a segmented bandwidth schedule (SBS) to the portal. The segmented bandwidth schedule may include a schedule of bandwidths (e.g., specified by CARs, LPSs, QoS treatment, bandwidth amounts, or the like) to be implemented for the user at particular times (e.g., during a particular day(s), month(s), or the like). The portal may provide the segmented bandwidth schedule to the provisioning system, and the provisioning system may receive the segmented bandwidth schedule. The provisioning system may utilize the automated bandwidth on demand to implement the segmented bandwidth schedule for the user.

For example, the provisioning system may generate provisioning commands that include information associated with updating bandwidth requirements for the user based on the segmented bandwidth schedule. As further shown in FIG. 1, the provisioning system may provide the provisioning commands to the network. One or more network resources of the network may utilize the provisioning commands to update the bandwidth requirements for the user. For example, the one or more network resources may increase a CAR (e.g., in megabits per second (mbps)), may increase a LPS (e.g., in mbps), or the like, associated with the user based on the provisioning commands. As further shown in FIG. 1, the provisioning system may provide the updated bandwidth requirements for the user (e.g., based on the SBS) to an order management system and/or to other systems (e.g., a billing system). The order management system may update information associated with the user (e.g., bandwidth requirements, QoS requirements, or the like) based on the updated bandwidth requirements. The billing system may update charges associated with the user based on the updated bandwidth requirements.

Systems and/or methods, described herein, may provide an automated bandwidth management process that enables a user to specify a bandwidth schedule one time, and that automatically implements the bandwidth schedule without further user intervention.

The term entity, as used herein, is intended to be broadly interpreted to include a business, an organization, a government agency, an educational institution, a user device, a user of a user device, or the like.

Figure 2:
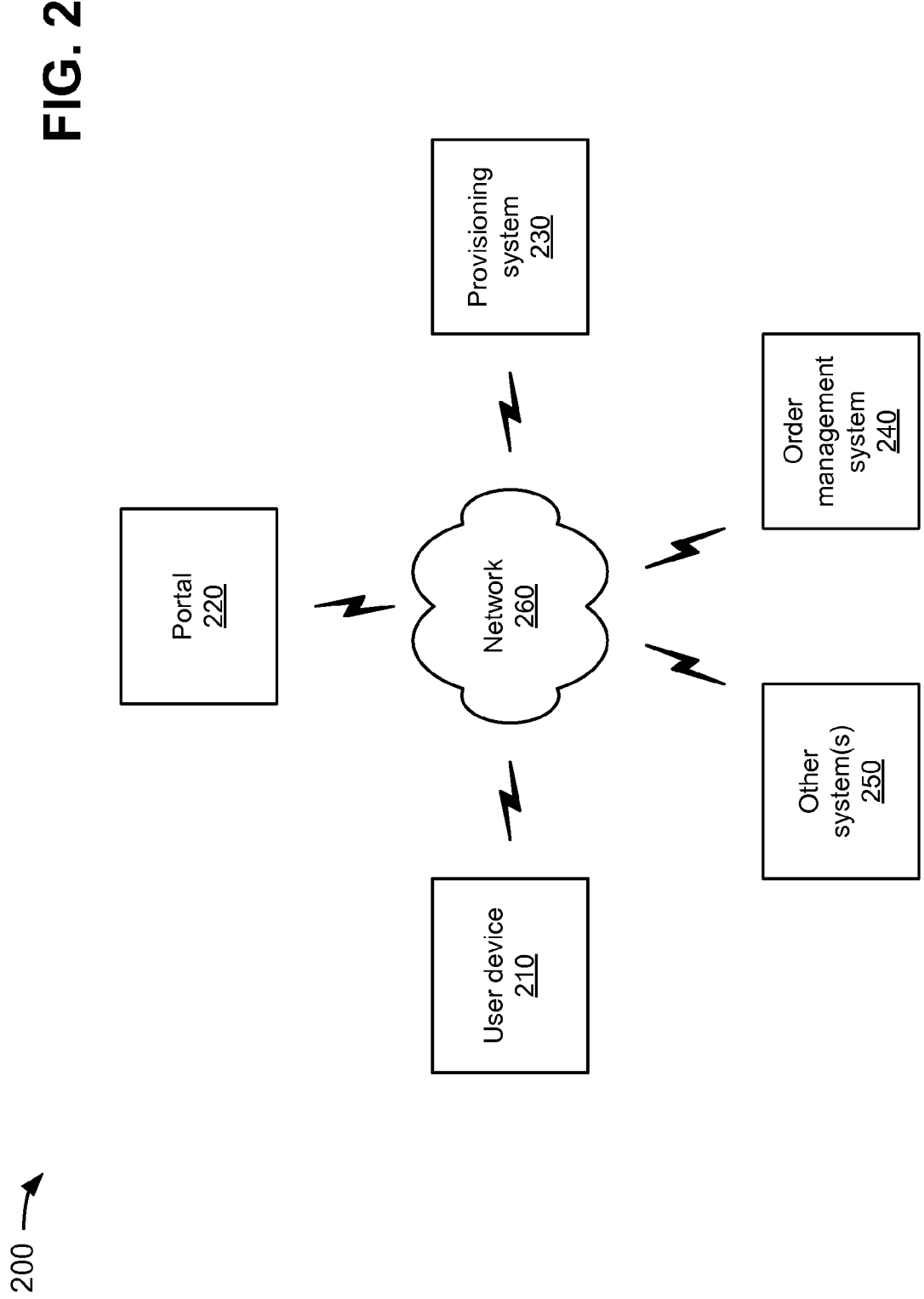
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include a user device 210, a portal 220, a provisioning system 230, an order management system 240, other system(s) 250, and a network 260. Devices/networks of environment 200 may interconnect via wired connections, wireless connections, or a combination of wired and wireless connections.

User device 210 may include a device that is capable of communicating over network 260 with portal 220, provisioning system 230, order management system 240, and/or other system(s) 250. In some implementations, user device 210 may include a radiotelephone; a personal communications services (PCS) terminal that may combine, for example, a cellular radiotelephone with data processing and data communications capabilities; a smart phone; a television; a laptop computer; a tablet computer; or another type of computation and communication device.

Portal 220 may include one or more personal computers, one or more workstation computers, one or more server devices, one or more virtual machines (VMs) provided in a cloud computing environment, or one or more other types of computation and communication devices. In some implementations, portal 220 may include a web portal that provides a web page which brings information together from diverse sources in a uniform way. In some implementations, portal 220 may provide each information source with a dedicated area on the web page for displaying information (e.g., a portlet). In some implementations, portal 220 may be associated with an entity that manages and/or operates network 260, such as, for example, a network service provider, a telecommunication service provider, a television service provider, an Internet service provider, or the like. In some implementations, portal 220 may not be associated with an entity that manages and/or operates network 260. In some implementations, portal 220 may enable user device 210 to communicate with provisioning system 230, order management system 240, and/or other system(s) 250. In some implementations, portal 220 may be omitted and user device 210 may communicate directly with provisioning system 230, order management system 240, and/or other system(s) 250.

Provisioning system 230 may include one or more personal computers, one or more workstation computers, one or more server devices, one or more VMs provided in a cloud computing environment, or one or more other types of computation and communication devices. In some implementations, provisioning system 230 may be associated with an entity that manages and/or operates network 260, such as, for example, a network service provider, a telecommunication service provider, a television service provider, an Internet service provider, or the like. In some implementations, provisioning system 230 may configure network 260 (e.g., network resources of network 260) so that network 260 may provide services to users and/or may provide users with access to data and/or technology resources.

In some implementations, provisioning system 230 may receive, from user device 210 (e.g., and via portal 220), an instruction to enable automated bandwidth on demand for a user, and may enable the automated bandwidth on demand for the user based on the instruction. Provisioning system 230 may receive, from user device 210, a segmented bandwidth schedule to be implemented for the user, and may utilize the automated bandwidth on demand to implement the segmented bandwidth schedule for the user. For example, provisioning system 230 may generate provisioning commands that include information associated with updating bandwidth requirements for the user based on the segmented bandwidth schedule, and may provide the provisioning commands to network 260. One or more network resources of network 260 may utilize the provisioning commands to update the bandwidth requirements for the user. Provisioning system 230 may provide the updated bandwidth requirements for the user to order management system 240 and/or to other system(s) 250.

Order management system 240 may include one or more personal computers, one or more workstation computers, one or more server devices, one or more VMs provided in a cloud computing environment, or one or more other types of computation and communication devices. In some implementations, order management system 240 may include one or more data structures, such as one or more databases, tables, lists, arrays, or the like. In some implementations, order management system 240 may store information used to identify and/or authenticate users of network 260, information associated with the users, information associated with usage of network 260, or the like. In some implementations, the information used to identify and/or authenticate users may include agreements entered into by the users with a provider of network 260; account information (e.g., account identifications, passwords, or the like) associated with the users; demographic information (e.g., name, address, telephone number, age, or the like) associated with the users; or the like. In some implementations, order management system 240 may be responsible for entry and processing of service requests provided by users and associated with use of network 260. In some implementations, order management system 240 may keep track of users of network 260, accounts of the users, credit verification for the users, service delivery to the users, billing for the users, or the like.

Other system(s) 250 may include one or more personal computers, one or more workstation computers, one or more server devices, one or more VMs provided in a cloud computing environment, or one or more other types of computation and communication devices. In some implementations, other system(s) 250 may include a billing system that tracks charges for users of network 260, generates bills based on the charges, and provides the bills to the users. In some implementations, other system(s) 250 may include any system used to manage network 260, such as, for example, a monitoring system to monitor operation of network 260, a network management system to control and manage network resources of network 260, or the like.

Network 260 may include one or more wired and/or wireless networks. For example, network 260 may include a cellular network (e.g., a long term evolution (LTE) network, a 3G network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
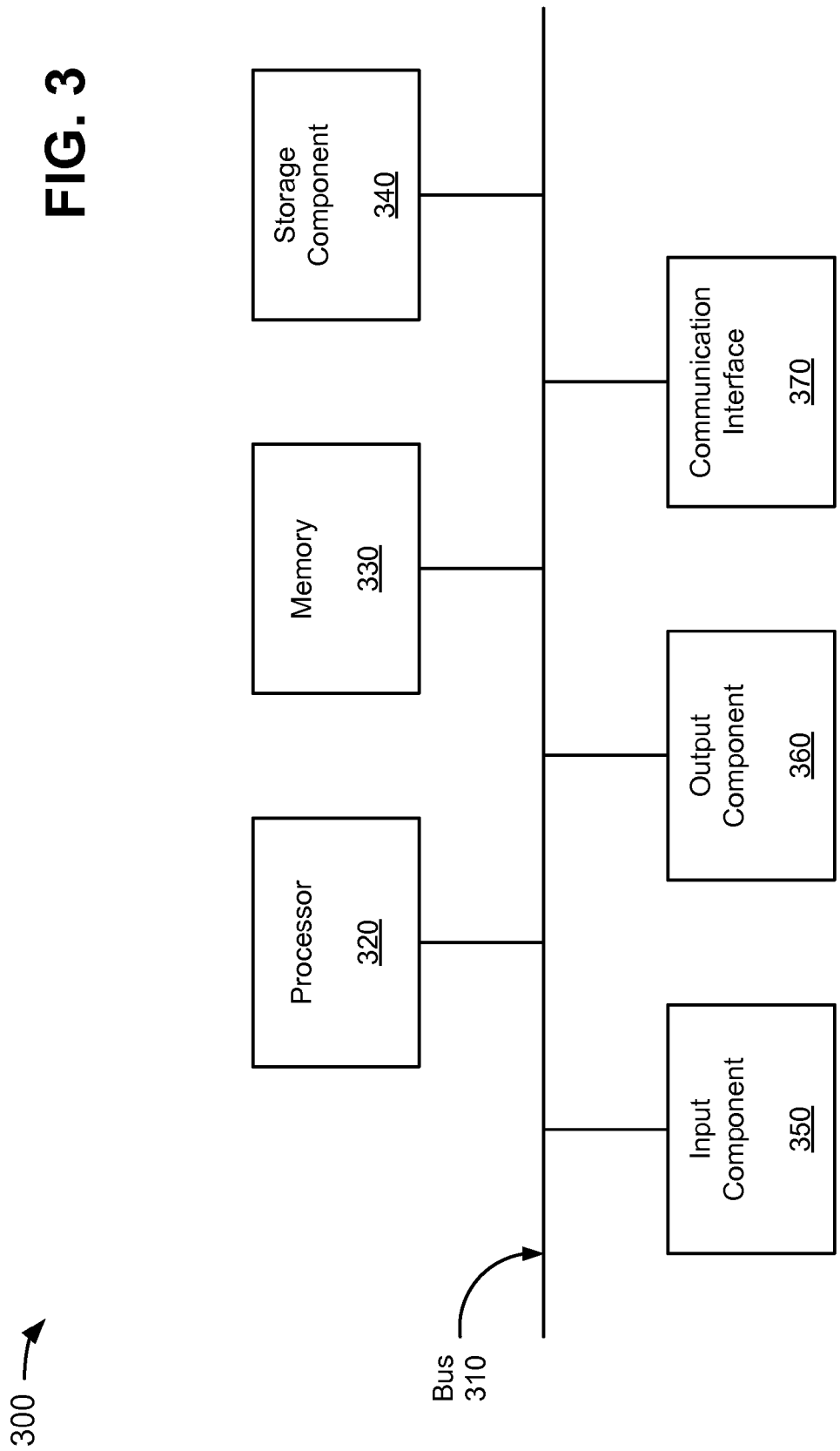
FIG. 3 is a diagram of example components of a device that may correspond to one or more of the devices of the environment depicted in FIG. 2.

FIG. 3 is a diagram of example components of a device 300. Device 300 may correspond to user device 210, portal 220, provisioning system 230, order management system 240, and/or other system(s) 250. In some implementations, user device 210, portal 220, provisioning system 230, order management system 240, and/or other system(s) 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. In some implementations, processor 320 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
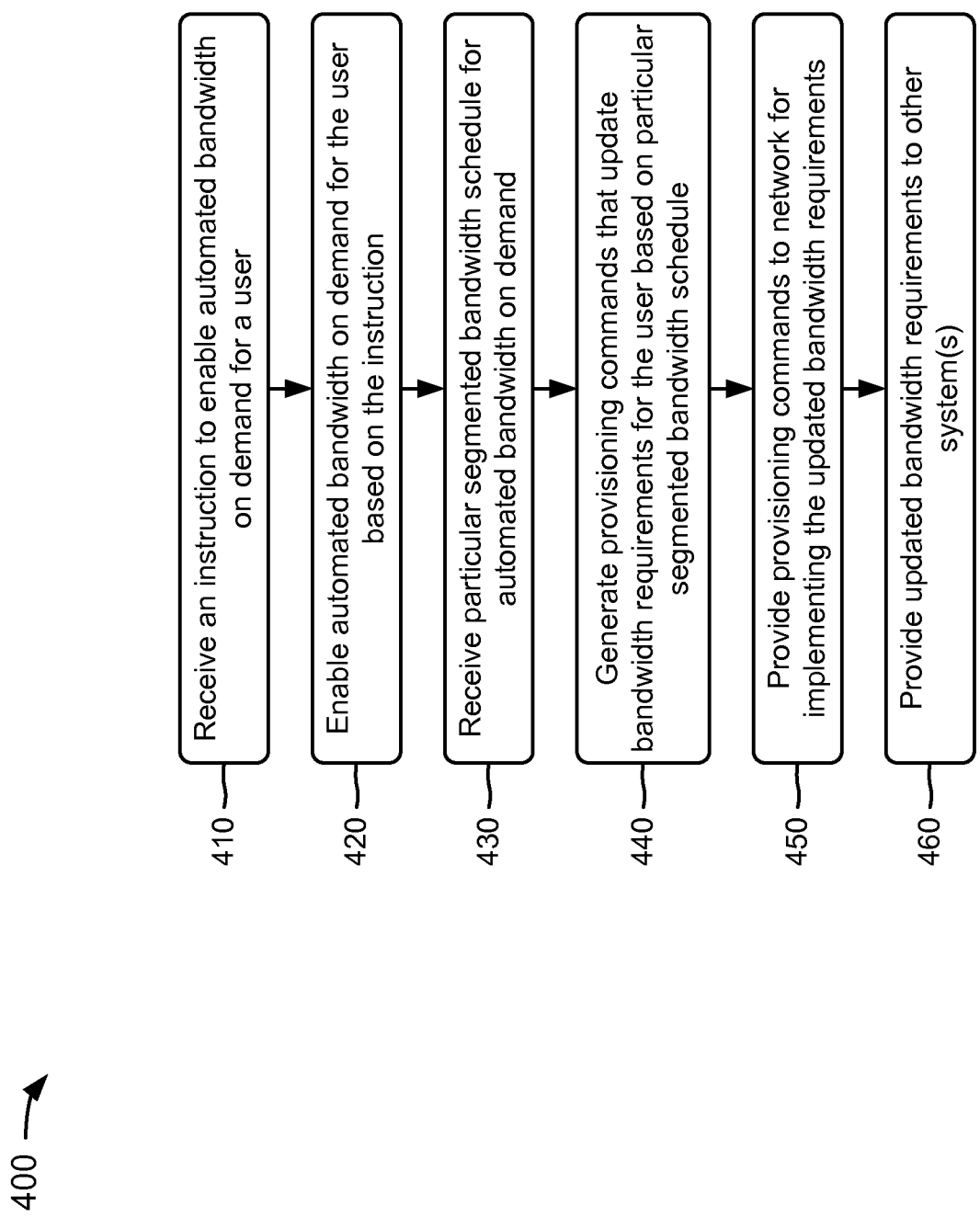
FIG. 4 is a flow chart of an example process for automatically managing network bandwidth for a user.

FIG. 4 is a flow chart of an example process 400 for automatically managing network bandwidth for a user. In some implementations, one or more process blocks of FIG. 4 may be performed by provisioning system 230. In some implementations, one or more process blocks of FIG. 4 may be performed by another device or a group of devices separate from or including provisioning system 230, such as portal 220.

As shown in FIG. 4, process 400 may include receiving an instruction to enable automated bandwidth on demand for a user (block 410). For example, a user may cause user device 210 to provide, to provisioning system 230 (e.g., via portal 220), one or more instructions that instruct provisioning system 230 to enable automated bandwidth on demand for the user, and provisioning system 230 may receive the one or more instructions. In some implementations, the automated bandwidth on demand executed by provisioning system 230 (hereinafter "automated bandwidth on demand application") may include an application, a code snippet, a script, a widget, or the like that causes provisioning system 230 to perform one or more functions described herein. For example, the automated bandwidth on demand application may cause provisioning system 230 to initiate dynamic bandwidth requests for the user, as described below.

In some implementations, provisioning system 230 may provide to the user (e.g., via user device 210 and/or portal 220) an option to enable the automated bandwidth on demand application for the user. If the user selects the option (e.g., via user device 210), user device 210 may provide, to provisioning system 230 (e.g., via portal 220), one or more instructions that instruct provisioning system 230 to enable the automated bandwidth on demand application for the user. If the user does not select the option, provisioning system 230 may not enable the automated bandwidth on demand application for the user, but may permit the user to manually provide user-specified bandwidth requirements at any time (e.g., via portal 220) and may implement the user-specified bandwidth requirements.

As further shown in FIG. 4, process 400 may include enabling the automated bandwidth on demand for the user based on the instruction (block 420). For example, provisioning system 230 may enable the automated bandwidth on demand application for the user based on the one or more instructions received from user device 210. In some implementations, if enabled by the user, the automated bandwidth on demand application may be executed by provisioning system 230 periodically (e.g., at particular time intervals in minutes, hours, days, or the like; at one or more specified times; or the like). In some implementations, the automated bandwidth on demand application may cause provisioning system 230 to obtain information associated with a portion of network 260 utilized by the user. In some implementations, the portion of network 260 utilized by the user may include one or more network resources of network 260 that provide bandwidth to devices associated with the user. For example, assume that the user is a corporation that includes a corporate office with servers connected to employee computers. In such an example, one or more network resources of network 260 may provide bandwidth to the servers and employee computers of the corporate office.

As further shown in FIG. 4, process 400 may include receiving a particular segmented bandwidth schedule for the automated bandwidth on demand (block 430). For example, the user may cause user device 210 to provide, to provisioning system 230 (e.g., via portal 220), a particular segmented bandwidth schedule for the user, and provisioning system 230 may receive the particular segmented bandwidth schedule. In some implementations, provisioning system 230 may utilize the particular segmented bandwidth schedule with the automated bandwidth on demand application.

In some implementations, the particular segmented bandwidth schedule may include a data structure (e.g., a database, a table, a list, or the like) with a time field, a CAR field, a burst rate/LPS field, and/or a QoS field, and multiple entries associated with the fields. The time field may provide information indicating particular times (e.g., a particular date (Monday), a particular month and day (February 15), a particular hour (11:00 AM), or the like) when particular bandwidth requirements are to be implemented for the user. The CAR field may provide information indicating particular committed access rates (CARs) (e.g., in mbps) for the particular times indicated by the time field. The burst rate/LPS field may provide information indicating particular burst rates per logical port speeds (LPSs) (e.g., in mbps) for the particular times indicated by the time field. The QoS field may provide information indicating particular QoS (e.g., standard, high, low, gold, silver, enhanced traffic management (ETM), or the like) for the particular times indicated by the time field. The information provided by the CAR field, the burst rate/LPS field, and the QoS field may ensure that the particular bandwidth requirements are provided by network 260 for the user.

In some implementations, provisioning system 230 may enable the user to specify a scheme associated with generating the particular segmented bandwidth schedule. For example, provisioning system 230 may provide, to user device 210, a user interface that includes different segmented bandwidth schedule generation schemes from which the user may select. In some implementations, the user interface may enable the user to select from a user-specified segmented bandwidth schedule generation scheme, a historical-based segmented bandwidth schedule generation scheme, a profile-based segmented bandwidth schedule generation scheme, or the like.

If the user selects the user-specified segmented bandwidth schedule generation scheme, provisioning system 230 may request (e.g., via user device 210) that the user provide entries for a time field, a CAR field, a burst rate/LPS field, and/or a QoS field of a user-specified segmented bandwidth schedule. For example, the user may provide November 1st in a first entry of the time field, 50 mbps in a first entry of the CAR field, 100 mbps in a first entry of the burst rate/LPS field, and enhanced traffic management (ETM) in a first entry of the QoS field; may provide March 15th in a second entry of the time field, 100 mbps in a second entry of the CAR field, 75 mbps in a second entry of the burst rate/LPS field, and Standard in a second entry of the QoS field; etc. In some implementations, the user may upload a file (e.g., a spreadsheet) with the information for the user-specified segmented bandwidth schedule rather than entering the information. In some implementations, provisioning system 230 may validate the information provided by the user for the user-specified segmented bandwidth schedule. If particular information of the user-specified segmented bandwidth schedule is not validated, provisioning system 230 may provide, to user device 210, an error indication and/or suggested corrections for the particular information and the user may correct the particular information. If the user-specified segmented bandwidth schedule is validated, provisioning system 230 may store the user-specified segmented bandwidth schedule in memory (e.g., memory 330 and/or storage component 340, FIG. 3) associated with provisioning system 230.

If the user selects the historical-based segmented bandwidth schedule generation scheme, provisioning system 230 may obtain historical network usage data (e.g., associated with one or more network resources of network 260) for the user for a particular time period (e.g., in days, months, years, or the like). In some implementations, provisioning system 230 may obtain the historical network usage data from memory associated with provisioning system 230 and/or from memory associated with order management system 240. The historical network usage data may include bandwidth usage (e.g., CAR, burst rate, LPS, or the like) of network 260 by the user for the particular time period, data usage of network 260 by the user for the particular time period, or the like. In some implementations, provisioning system 230 may request (e.g., via user device 210) that the user provide a minimal interval (e.g., in hours, days, date range, or the like) to use for generation of the historical-based segmented bandwidth schedule. In some implementations, provisioning system 230 may request (e.g., via user device 210) that the user provide a start date and, optionally, an end date to use for generation of the historical-based segmented bandwidth schedule.

In some implementations, provisioning system 230 may determine a minimum, a maximum, a mean, and/or a standard deviation for the historical network usage data based on the minimal interval. For example, if the historical network usage data includes one year of data and the minimal interval is thirty days (or one month), provisioning system 230 may determine a minimum, a maximum, a mean, and/or a standard deviation for each month (e.g., the minimal interval) of the one year of historical network usage data. In some implementations, provisioning system 230 may determine transition dates for each segment (e.g., time period) of the historical-based segmented bandwidth schedule for consecutive minimal intervals having network usage (e.g., measured by the CAR, burst rate, LPS, or the like) that is less than a sum of the mean (m) and three times the standard deviation (σ) (e.g., m+3σ). In some implementations, for each segment of the historical-based segmented bandwidth schedule, provisioning system 230 may determine a CAR based on a sum of the mean (m) and the standard deviation (σ) (e.g., CAR=m+σ) and a burst rate (BR) based on a sum of the mean (m) and three times the standard deviation (σ) (e.g., BR=m+3σ).

In some implementations, provisioning system 230 may generate the historical-based segmented bandwidth schedule using the determined transition date, CAR, and/or burst rate for each segment of the historical-based segmented bandwidth schedule. In some implementations, provisioning system 230 may store the historical-based segmented bandwidth schedule in memory associated with provisioning system 230. In some implementations, if less than a year of network usage data is available for the user, provisioning system 230 may set a last segment of the historical-based segmented bandwidth schedule with a highest CAR and a highest burst rate.

If the user selects the profile-based segmented bandwidth schedule generation scheme, provisioning system 230 may obtain profile information associated with a profile of the user. In some implementations, provisioning system 230 may obtain the profile information from memory associated with provisioning system 230 and/or from memory associated with order management system 240. In some implementations, the profile information may include information associated with a type and nature of the user's use of network 260 (e.g., a call center, a retail store, a restaurant, a corporate office, or the like); agreements entered into by the user with a provider of network 260; account information (e.g., account identifications, passwords, or the like) associated with the user; demographic information (e.g., name, address, telephone number, age, or the like) associated with the user; or the like. In some implementations, the profile information may include blended profile information if the user utilizes network 260 for multiple purposes. For example, a user associated with a corporate and retail office may create a blended or hybrid profile if the user includes the two business functions within a same building.

In some implementations, provisioning system 230 may receive the profile information from the user (e.g., via user device 210 and prior to generation of the profile-based segmented bandwidth schedule) based on a series of questions provided to the user. Provisioning system 230 may create the profile for the user based on the profile information (e.g., based on the answers provided to the series of questions). In some implementations, provisioning system 230 may generate the profile-based segmented bandwidth schedule for the user based on the profile information. For example, if the profile information indicates that the user is a retail store, provisioning system 230 may identify a segmented bandwidth schedule for another user that is a retail store with similar attributes as the user (e.g., similar sized retail store, similarly located retail store, similar type of retail store, or the like). In such an example, provisioning system 230 may utilize the identified segmented bandwidth schedule as the profile-based segmented bandwidth schedule for the user. In some implementations, provisioning system 230 may store the profile-based segmented bandwidth schedule in memory associated with provisioning system 230.

In some implementations, provisioning system 230 may utilize standard profiles that fit network usage trends to determine the profile-based segmented bandwidth schedule for the user. In some implementations, provisioning system 230 may utilize the standard profiles and the user's custom profile to determine the profile-based segmented bandwidth schedule for the user.

In some implementations, the segmented bandwidth schedules may be customized on a per network resource (e.g., network device, circuit, or the like of network 260) basis. In some implementations, the segmented bandwidth schedules may be customized for all network resources of network 260 on a per user basis. In some implementations, provisioning system 230 may automatically determine trends and/or patterns in the network usage of the user for a particular time period, and may create a segmented bandwidth schedule for an upcoming time period based on the network usage trends and/or patterns.

As further shown in FIG. 4, process 400 may include generating provisioning commands that update bandwidth requirements for the user based on the particular segmented bandwidth schedule (block 440). For example, provisioning system 230 may generate provisioning commands that update bandwidth requirements for the user based on the particular segmented bandwidth schedule. In some implementations, the particular segmented bandwidth schedule may include the user-specified segmented bandwidth schedule, the historical-based segmented bandwidth schedule, or the profile-based segmented bandwidth schedule. In some implementations, the provisioning commands may include information that instructs one or more network resources of network 260, associated with the user, to update a CAR, a burst rate, a LPS, a QoS, or the like, in accordance with the particular segmented bandwidth schedule.

In some implementations, provisioning system 230 may generate the provisioning commands for one or more portions of network 260. For example, assume that a first set of network resources forms a first portion of network 260 utilized by a first user and a second user, a second set of network resources forms a second portion of network 260 utilized by the second user, and a third set of network resources forms a third portion of network 260 utilized by a third user and a fourth user. In such an example, provisioning system 230 may generate provisioning commands that instruct the first set of network resources to utilize bandwidth requirements specified by the segmented bandwidth schedules of the first user and the second user. Provisioning system 230 may generate provisioning commands that instruct the second set of network resources to utilize bandwidth requirements specified by the segmented bandwidth schedule of the second user. Provisioning system 230 may generate provisioning commands that instruct the third set of network resources to utilize bandwidth requirements specified by the segmented bandwidth schedules of the third user and the fourth user.

In some implementations, provisioning system 230 may permit the user to initiate bandwidth change overrides that take precedence over the bandwidth requirements specified by particular segmented bandwidth schedule for the user. For example, assume that the user is unexpectedly experiencing a high usage of network 260 that exceeds the bandwidth specified by the particular segmented bandwidth schedule. In such an example, the user may instruct provisioning system 230 (e.g., via user device 210 and portal 220) to increase the bandwidth for the user in order to accommodate the high usage, and provisioning system 230 may increase the bandwidth for the user. In some implementations, provisioning system 230 may automatically generate alerts for the user if the user's actual bandwidth usage is exceeding (or is significantly less than) the bandwidth allotted by the particular segmented bandwidth schedule. In some implementations, provisioning system 230 may automatically change the bandwidth allotted to the user if the user's actual bandwidth usage is exceeding (or is significantly less than) the bandwidth allotted by the particular segmented bandwidth schedule.

As further shown in FIG. 4, process 400 may include providing the provisioning commands to the network for implementing the updated bandwidth requirements (block 450). For example, provisioning system 230 may provide the provisioning commands to one or more network resources of network 260 for implementing the updated bandwidth requirements for the user pursuant to the particular segmented bandwidth schedule. In some implementations, the provisioning commands may instruct the one or more network resources of network 260, associated with the user, to update a CAR, a burst rate, a LPS, a QoS, or the like, in accordance with the particular segmented bandwidth schedule.

For example, assume that the particular segmented bandwidth schedule indicates that on Feb. 20, 2015 the user wishes to update the CAR to 10 mbps, update the burst rate/LPS to 40 mbps, and update the QoS to standard. In such an example, on Feb. 20, 2015, provisioning system 230 may instruct the network resources associated with the user to update the CAR to 10 mbps, update the burst rate/LPS to 40 mbps, and update the QoS to standard.

As further shown in FIG. 4, process 400 may include providing the updated bandwidth requirements to one or more other system(s) (block 460). For example, provisioning system 230 may provide the updated bandwidth requirements to order management system 240 and/or other system(s) 250. In some implementations, order management system 240 may update information associated with usage of network 260 by the user, based on the updated bandwidth requirements, and may store the updated information in memory associated with order management system 240. In some implementations, other system(s) 250 may utilize the updated bandwidth requirements to update information associated with the user, and may store the updated information in memory associated with other system(s) 250. For example, if other system(s) 250 is a billing system, the billing system may track charges for the user based on the updated bandwidth requirements, generate a bill based on the charges, and provide the bill to the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5D:
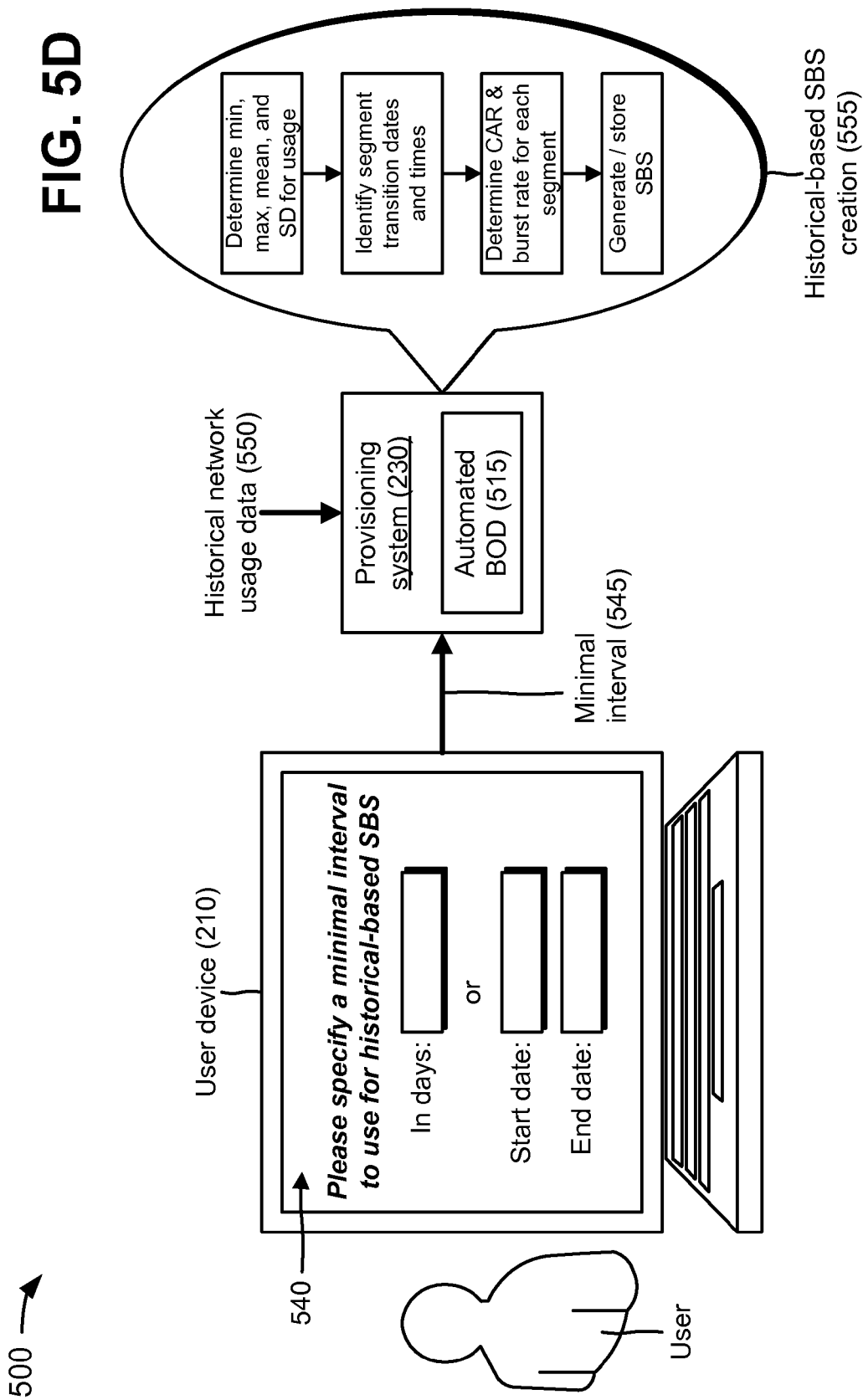

FIGS. 5A-5F are diagrams of an example 500 relating to example process 400 shown in FIG. 4. In example 500, it is assumed that portal 220 and provisioning system 230 are operated by the same entity (e.g., a network service provider). As shown in FIG. 5A, assume that provisioning system 230 provides a user interface 505 to user device 210, via portal 220, and that user device 210 provides user interface 505 for display to a user. User interface 505 may request that the user indicate whether the user wants to enable automated bandwidth on demand (BOD) functionality, and may include "Yes" and "No" selection mechanisms (e.g., buttons, icons, links, or the like). Assume that the user wants to enable the automated BOD functionality and selects the "Yes" selection mechanism. The "Yes" selection mechanism, when selected, may cause user device 210 to provide, to portal 220, an instruction 510 (e.g., a request) to enable the automated BOD functionality for the user. Portal 220 may provide instruction 510 to provisioning system 230, and provisioning system 230 may receive instruction 510. Provisioning system 230 may enable the automated BOD functionality based on instruction 510, as indicated by reference number 515 in FIG. 5A. Portal 220 is omitted from FIGS. 5B-5F for clarity, but communications between user device 210 and provisioning system 230 may be provided via portal 220.

As shown in FIG. 5B, assume that provisioning system 230 provides a user interface 520 to user device 210, via portal 220, and that user device 210 provides user interface 520 for display to the user. User interface 520 may request that the user select a particular segmented bandwidth schedule (SBS) generation scheme to utilize for automated BOD 515, and may include selection mechanisms (e.g., buttons, icons, links, or the like) for a user-specified SBS generation scheme, a historical-based SBS generation scheme, and a profile-based SBS generation scheme. Assume that the user selects one of the SBS generation schemes, via the selection mechanisms of user interface 520, which causes user device 210 to provide, to portal 220, a selection 525 of one of the SBS generation schemes. Portal 220 may provide selection 525 to provisioning system 230, and provisioning system 230 may receive selection 525.

If the user selects the user-specified SBS generation scheme, via selection 525, provisioning system 230 may provide a user interface 530 to user device 210 (e.g., via portal 220), and user device 210 may provide user interface 530 for display to the user, as shown in FIG. 5C. User interface 530 may request that the user provide entries for a user-specified SBS that includes a data structure with a time field, a CAR field, a burst rate/LPS field, and a QoS field, as described above. The user may utilize user interface 530 to provide entries for the user-specified SBS. For example, the user may provide month and date entries (e.g., 11/1 and 6/1) in the time field, CAR values (e.g., 50 mbps and 10 mbps) in the CAR field, burst rate/LPS values (e.g., 100 mbps and 40 mbps) in the burst rate/LPS field, and QoS identifiers (e.g., Enhanced traffic management (ETM) and Standard) in the QoS field. Once the user provides the entries for the user-specified SBS, the user may cause user device 210 to provide the user-specified SBS to provisioning system 230 (e.g., via portal 220), as indicated by reference number 535 in FIG. 5C.

If the user selects the historical-based SBS generation scheme, via selection 525, provisioning system 230 may provide a user interface 540 to user device 210 (e.g., via portal 220), and user device 210 may provide user interface 540 for display to the user, as shown in FIG. 5D. User interface 540 may request that the user provide a minimal interval 545 for the historical-based SBS in days or based on a date range (e.g., a start date and an end date). The user may utilize user interface 540 to provide minimal interval 545 for the historical-based SBS, and may cause user device 210 to provide minimal interval 545 to provisioning system 230 (e.g., via portal 220). Provisioning system 230 may also receive historical network usage data 550 for the user, and may utilize minimal interval 545 and historical network usage data 550 to create the historical-based SBS, as indicated by reference number 555 in FIG. 5D.

For example, provisioning system 230 may determine a minimum, a maximum, a mean, and/or a standard deviation for historical network usage data 550, based on minimal interval 545, and may determine segment transition dates and/or times of the historical-based SBS. Provisioning system 230 may determine a CAR and a burst rate for each segment of the historical-based SBS, may generate the historical-based SBS using the determined transition date/time, CAR, and/or burst rate for each segment of the historical-based SBS, and may store the historical-based SBS.

If the user selects the profile-based SBS generation scheme, via selection 525, provisioning system 230 may provide a user interface 560 to user device 210 (e.g., via portal 220), and user device 210 may provide user interface 560 for display to the user, as shown in FIG. 5E. User interface 560 may request that the user provide profile information 565 associated with the user, such as how network 260 will be used by the user (e.g., for a call center, a retail store, a restaurant, a corporate office, or the like), a bandwidth estimate, or the like. For example, the call center may require significantly more bandwidth than the retail store, the retail store may experience seasonal peaks in bandwidth usage and the corporate office may not, or the like. The user may utilize user interface 560 to provide profile information 565 for the profile-based SBS, and may cause user device 210 to provide profile information 565 to provisioning system 230 (e.g., via portal 220). Provisioning system 230 may utilize profile information 565 to create the profile-based SBS, as indicated by reference number 570 in FIG. 5E. For example, provisioning system 230 may create a user profile for the user based on profile information 565, may generate the profile-based SBS using the user profile, and may store the profile-based SBS.

Figure 5F:
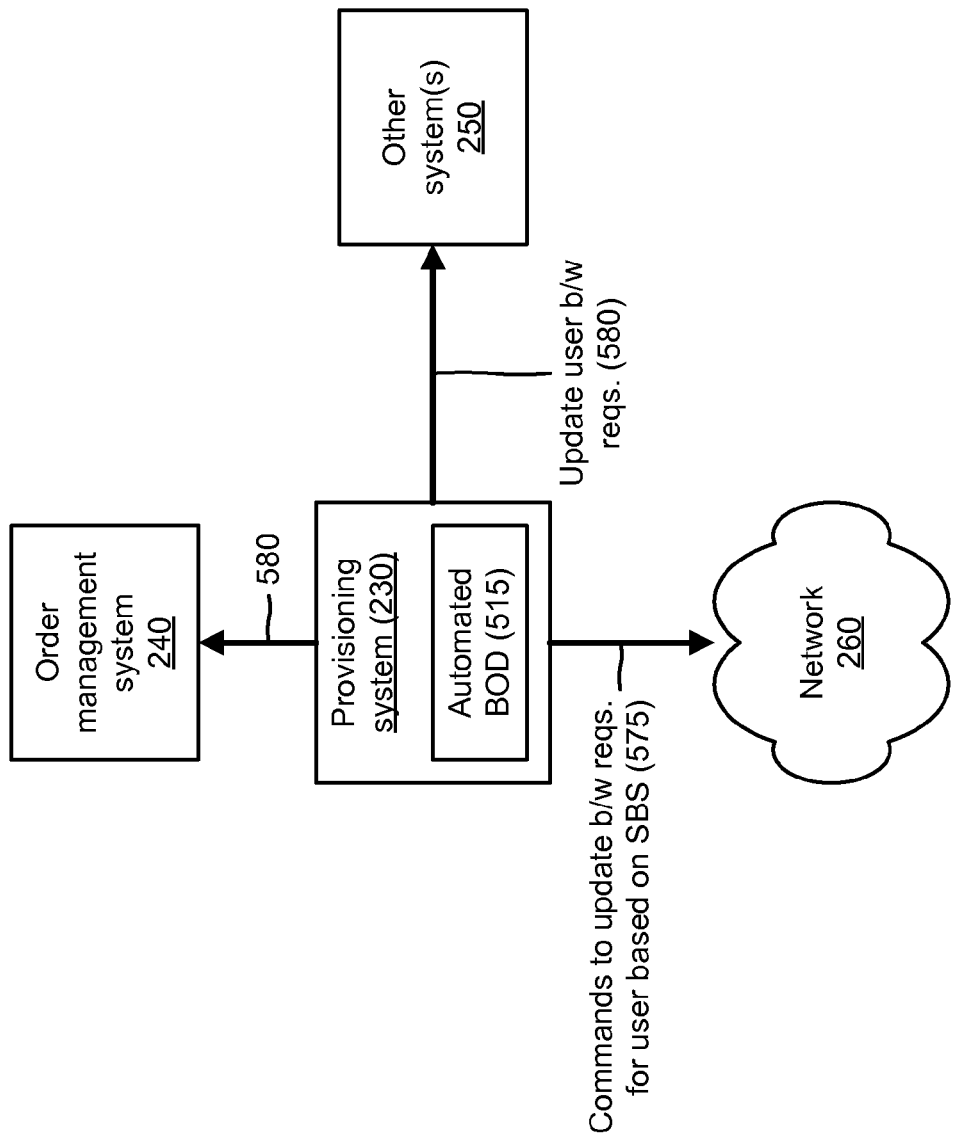

Provisioning system 230 may utilize automated BOD 515 to implement the selected SBS for the user. For example, as shown in FIG. 5F, provisioning system 230 may generate commands 575 that include information associated with updating bandwidth requirements for the user based on the selected SBS, and may provide commands 575 to network 260. One or more network resources of network 260 may utilize commands 575 to update the bandwidth requirements (e.g., by increasing or decreasing a CAR, a burst rate, a LPS, or the like) for the user. As further shown in FIG. 5F, provisioning system 230 may provide the updated bandwidth requirements, as indicated by reference number 580, to order management system 240 and/or to other system(s) 250. Order management system 240 may update information associated with the user (e.g., bandwidth requirements, QoS requirements, or the like) based on the updated bandwidth requirements. Other system(s) 250 may update charges associated with the user based on the updated bandwidth requirements.

As indicated above, FIGS. 5A-5F are provided merely as an example. Other examples are possible and may differ from what was described with regard to FIGS. 5A-5F. In some implementations, the various operations described in connection with FIGS. 5A-5F may be performed automatically or at the request of a user.

Figure 6A:
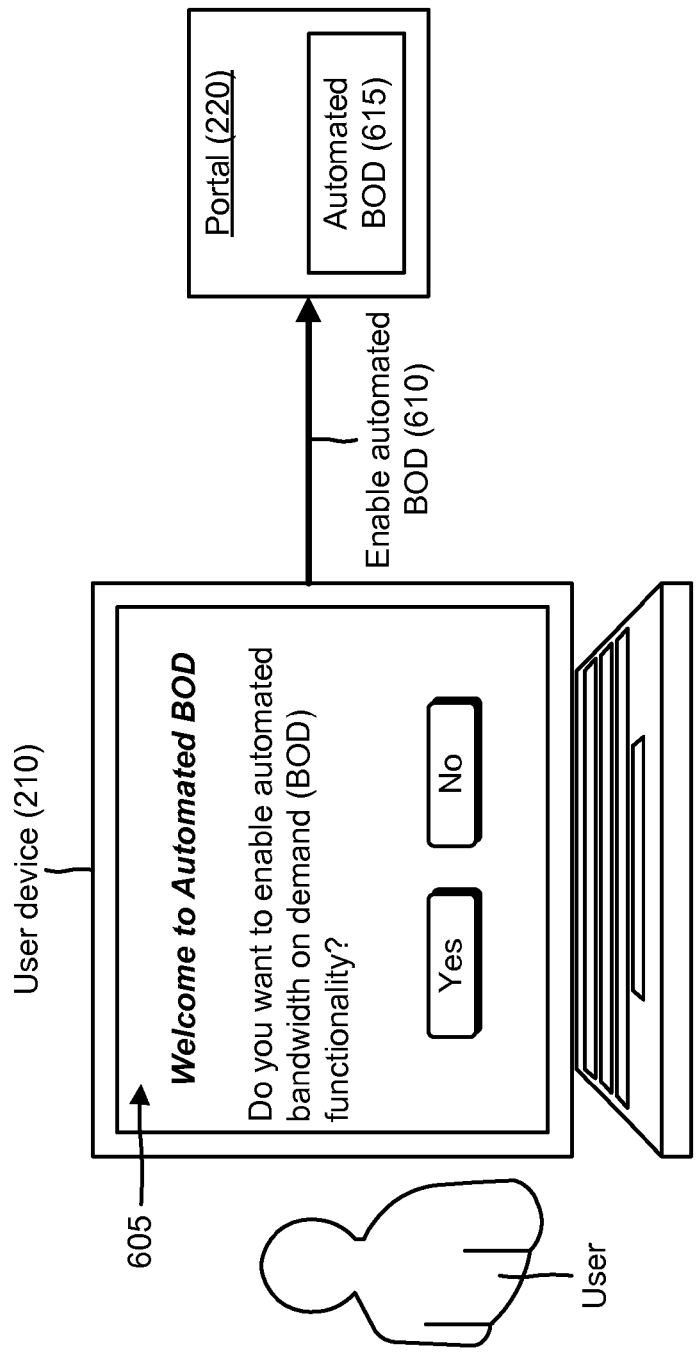

FIGS. 6A-6G are diagrams of another example 600 relating to example process 400 shown in FIG. 4. In example 600 it is assumed that multiple provisioning systems 230 are operated by different entities (e.g., different network service providers A, B, and C), and that portal 220 is operated by an entity that is different than the entities operating the multiple provisioning systems 230. As shown in FIG. 6A, assume that portal 220 provides a user interface 605 to user device 210, and that user device 210 provides user interface 605 for display to a user. User interface 605 may request that the user indicate whether the user wants to enable automated BOD functionality, and may include "Yes" and "No" selection mechanisms (e.g., buttons, icons, links, or the like). Assume that the user wants to enable the automated BOD functionality and selects the "Yes" selection mechanism. The "Yes" selection mechanism, when selected, may cause user device 210 to provide, to portal 220, an instruction 610 to enable the automated BOD functionality for the user. Portal 220 may enable the automated BOD functionality based on instruction 610, as indicated by reference number 615 in FIG. 6A.

Figure 6B:
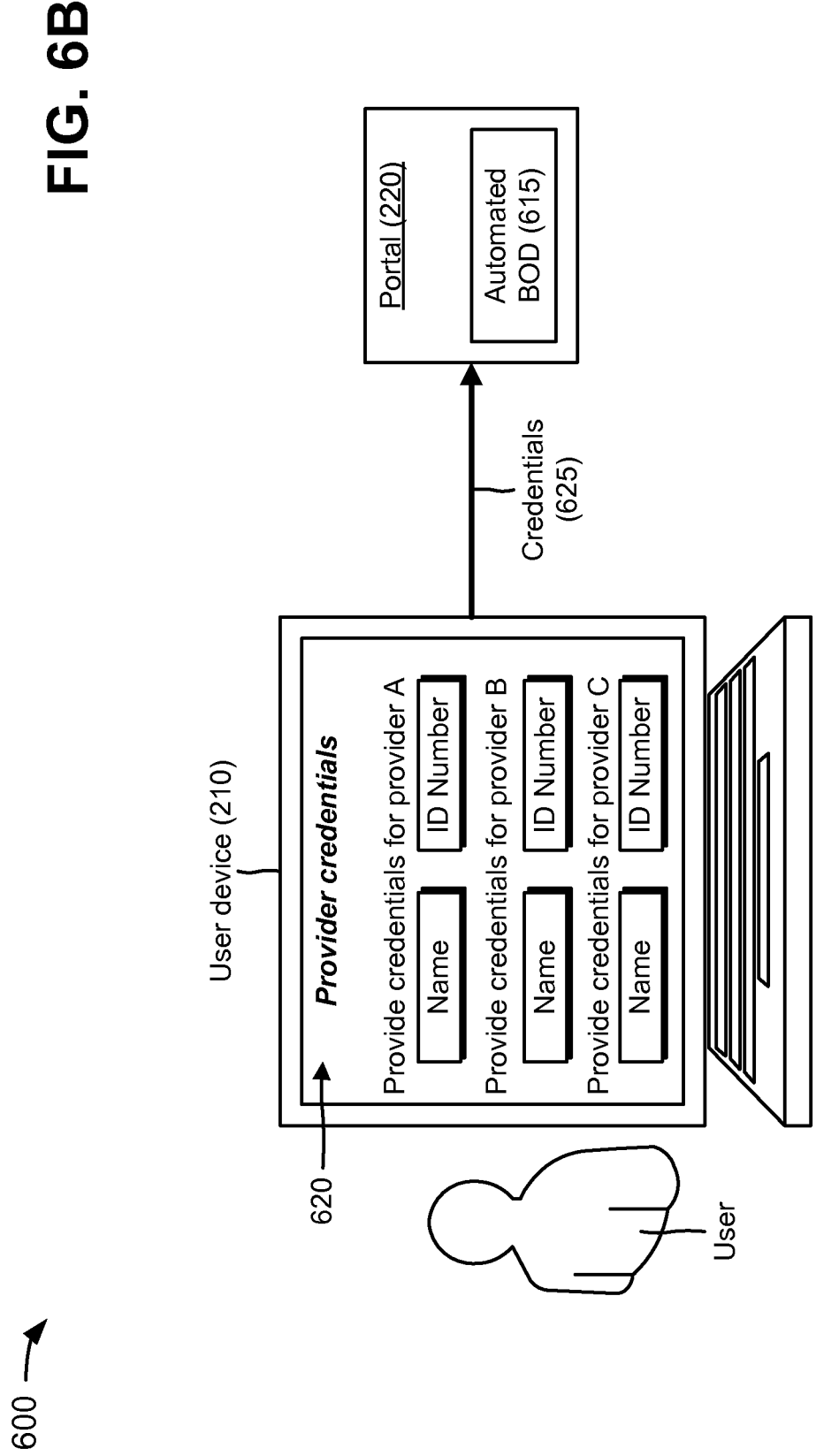

As shown in FIG. 6B, assume that portal 220 provides a user interface 620 to user device 210, and that user device 210 provides user interface 620 for display to the user. User interface 620 may request that the user provide credentials 625 of the user (e.g., user names, user passwords, user account identification (ID) numbers, or the like) for each of providers A, B, and C. Assume that the user provides credentials 625 for each of providers A, B, and C, and instructs user device 210 to provide credentials 625 to portal 220. Portal 220 may receive credentials 625, and may store credentials 625.

Figure 6C:
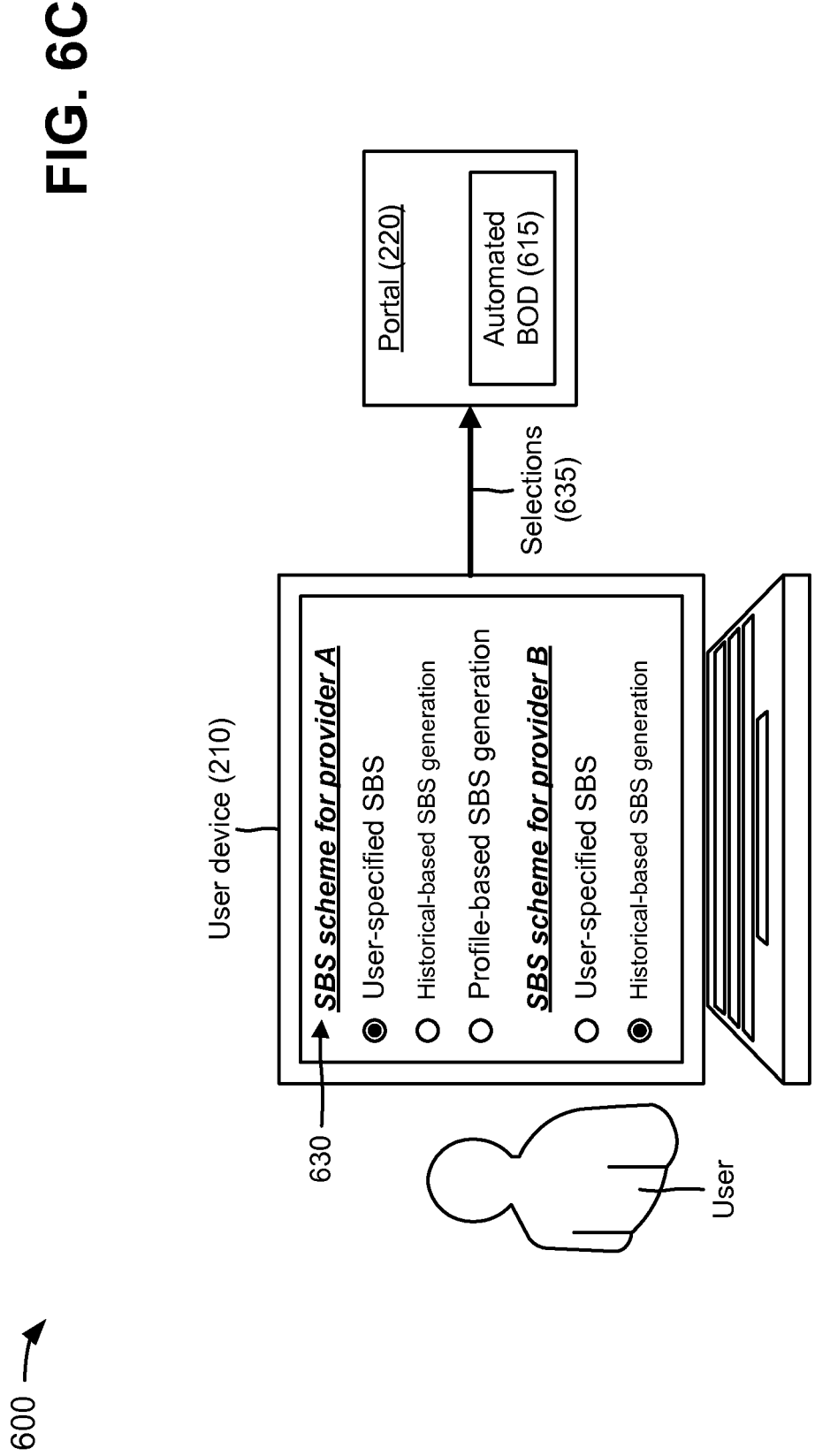

As shown in FIG. 6C, assume that portal 220 provides a user interface 630 to user device 210, and that user device 210 provides user interface 630 for display to the user. User interface 630 may request that the user select a particular SBS generation scheme to utilize for each of providers A, B, and C, and may include selection mechanisms (e.g., buttons, icons, links, or the like) for a user-specified SBS generation scheme, a historical-based SBS generation scheme, and a profile-based SBS generation scheme. Assume that the user selects one of the SBS generation schemes for each of providers A, B, and C, via the selection mechanisms of user interface 520, which causes user device 210 to provide, to portal 220, selections 635 of the SBS generation schemes.

Figure 6D:
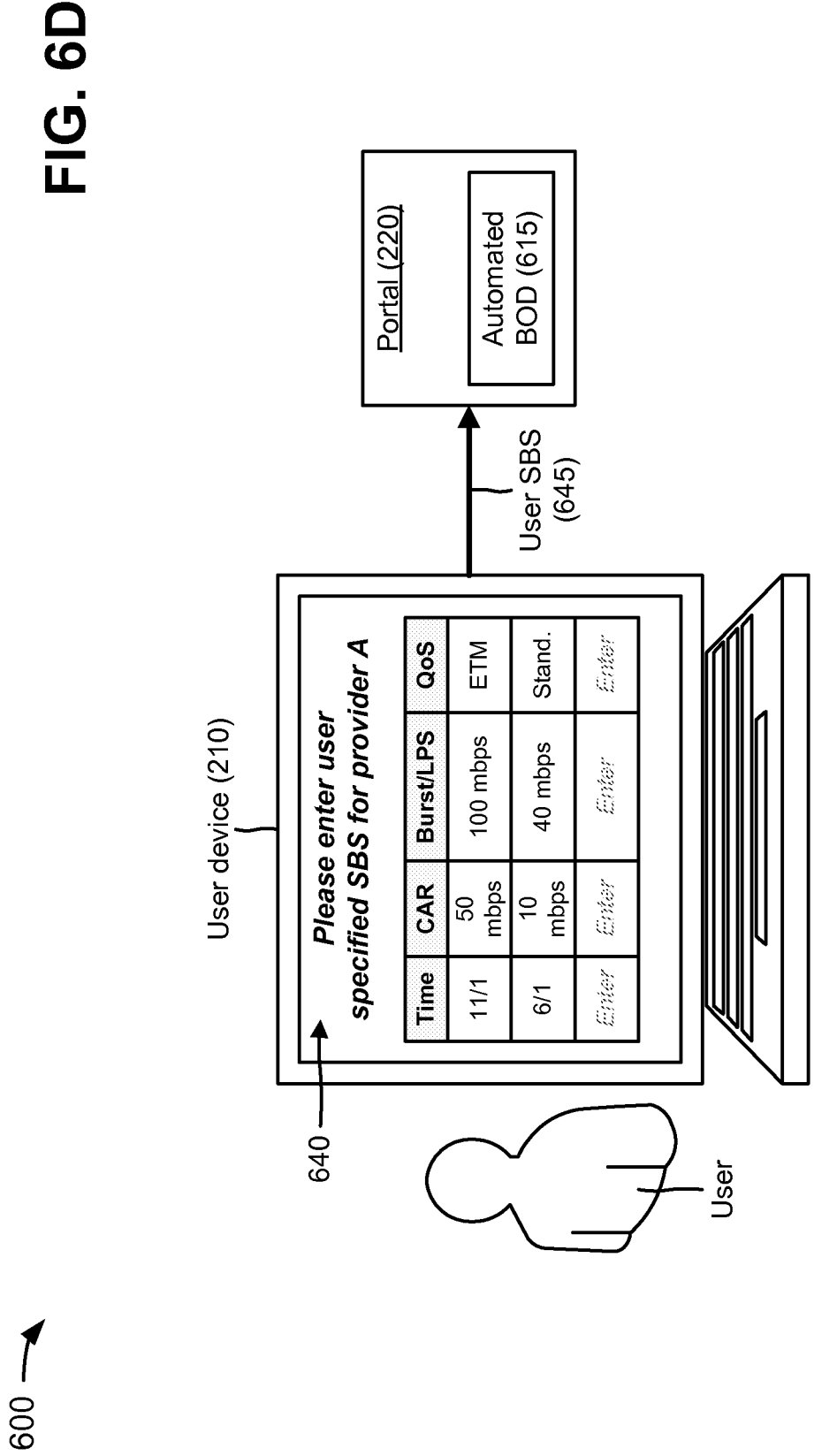

If the user selects the user-specified SBS generation scheme for provider A, via selections 635, portal 220 may provide a user interface 640 to user device 210, and user device 210 may provide user interface 640 for display to the user, as shown in FIG. 6D. User interface 640 may request that the user provide entries for a user-specified SBS that includes a data structure with a time field, a CAR field, a burst rate/LPS field, and a QoS field, as described above. The user may utilize user interface 640 to provide entries for the user-specified SBS, as described above in connection with FIG. 5C. Once the user provides the entries for the user-specified SBS, the user may cause user device 210 to provide the user-specified SBS to portal 220, as indicated by reference number 645 in FIG. 6D.

If the user selects the historical-based SBS generation scheme for provider B, via selections 635, portal 220 may provide a user interface 650 to user device 210, and user device 210 may provide user interface 650 for display to the user, as shown in FIG. 6E. User interface 650 may request that the user provide a minimal interval 655 for the historical-based SBS in days or based on a date range (e.g., a start date and an end date). The user may utilize user interface 650 to provide minimal interval 655 for the historical-based SBS, and may cause user device 210 to provide minimal interval 655 to portal 220. Portal 220 may receive historical network usage data 660 for the user (e.g., of a network provided by provider B), and may utilize minimal interval 655 and historical network usage data 660 to create the historical-based SBS, as indicated by reference number 665 in FIG. 6E and as described above in connection with FIG. 5D.

If the user selects the profile-based SBS generation scheme for provider C, via selections 635, portal 220 may provide a user interface 670 to user device 210, and user device 210 may provide user interface 670 for display to the user, as shown in FIG. 6F. User interface 670 may request that the user provide profile information 675 associated with the user, such as how a network associated with provider C will be used by the user (e.g., for a call center, a retail store, a restaurant, a corporate office, or the like), a bandwidth estimate, or the like. The user may utilize user interface 670 to provide profile information 675 for the profile-based SBS, and may cause user device 210 to provide profile information 675 to portal 220. Portal 220 may utilize profile information 675 to create the profile-based SBS, as indicated by reference number 680 in FIG. 6F. For example, portal 220 may create a user profile for the user based on profile information 675, may generate the profile-based SBS using the user profile, and may store the profile-based SBS.

As shown in FIG. 6G, a managed services portal (MSP) 220 may be provided and may include a higher level portal that interacts with self-service portals of multiple providers but does not interact with the providers' provisioning systems. MSP 220 may utilize automated BOD 615 to implement the selected SBSs of the user for providers A, B, and C, as shown in FIG. 6G. MSP 220 may offer a subscription or a fee-based automated BOD 615 for users' circuits with multiple providers. MSP 220 may provide a user interface that enables users (e.g., via user devices 210) to log in to MSP 220, select providers, and provide user credentials (e.g., a user identifier, an email identifier, a password, a unique entitlement code, or the like) for each provider. MSP 220 may provide a user interface that enables users (e.g., via user devices 210) to retrieve information associated with the users' circuits, user billing account numbers for the selected providers, or the like. In some implementations, MSP 220 may allow a user to input user-specified SBSs or profile-based SBSs until historical-based SBSs are created over time. When the historical-based SBSs are created by MSP 220, MSP 220 may utilize the historical-based SBSs to initiate requests.

As further shown in FIG. 6G, provider A may be associated with a self-service portal 220-A, provisioning system 230-A, and network 260-A. Provider B may be associated with a self-service portal 220-B, provisioning system 230-B, and network 260-B. Provider C may be associated with a self-service portal 220-C, provisioning system 230-C, and network 260-C. Self-service portals 220 may be accessible outside the providers' firewalls and may be entry points to access information associated with the users' circuits, bandwidth, network usage, or the like. In some implementations, MSP 220 may not provide SBSs directly to self-service portals 220, but self-service portals 220 may provide interfaces, web services, or the like that enable the users to change bandwidth, CAR, LPS, burst rates, QoS, or the like.

In some implementations, users may log into MSP 220 and enable automated BOD 615 for one or more circuits associated with one or more providers to use profile-based SBSs, user-specified SBSs, or historical-based SBSs. MSP 220 (e.g., via automated BOD 615) may periodically verify if any circuits need bandwidth adjustments based on an active SBS for each circuit and each user. For each circuit needing a bandwidth adjustment, MSP 220 (e.g., via automated BOD 615) may initiate a secure session with a corresponding provider's self-service portal 220 and may send or invoke a change bandwidth request specifying a circuit identifier, a CAR, a LPS, a burst rate, a QoS, or the like. The provider's self-service portal 220 may validate the request received from MSP 220 and may initiate a corresponding change bandwidth request with the provider's provisioning system 230

In response, the provider's provisioning system 230 may translate the change bandwidth request into corresponding commands for network devices, and may establish secure sessions with one or more network devices to invoke the commands. The network devices may include provider side network devices and/or customer premise equipment (CPE), if the user has a managed CPE arrangement with the provider. The network devices may accept the commands via a command language interface (CLI), application programming interfaces (APIs), web services, or the like. Upon successfully executing the commands (e.g., to affect the CAR, the LPS, the burst rate, the QoS, or the like for the associated circuit), the network devices may send a success response to the provider's provisioning system 230. The provider's provisioning system 230 may receive the success response from the network devices, and may store the successfully updated CAR, LPS, burst rate, peak speed, QoS, or the like, in a database for the associated customer circuit. The provider's provisioning system 230 may send a success response to the provider's self-service portal 220.

The provider's self-service portal 220 may receive the success response, and may send a corresponding success response to MSP 220. MSP 220 (e.g., via automated BOD 615) may receive the success response from the provider's self-service portal 220, may update the user's information (e.g., including a current bandwidth in effect for the user's circuit), and may notify the user if user alerts are enabled.

As further shown in FIG. 6G, self-service portal 220-A may receive credentials 625-A of the user (e.g., for provider A) and information 685-A associated with a user-specified SBS from MSP 220. Self-service portal 220-A may generate a user-specified SBS 690-A based on information 685-A, and may provide credentials 625-A and user-specified SBS 690-A to provisioning system 230-A. Provisioning system 230-A may generate commands 695-A that include information associated with updating bandwidth requirements for the user based on user-specified SBS 690-A, and may provide commands 695-A to network 260-A. One or more network resources of network 260-A may utilize commands 695-A to update the bandwidth requirements (e.g., by increasing or decreasing a CAR, a burst rate, a LPS, or the like) for the user.

As further shown in FIG. 6G, self-service portal 220-B may receive credentials 625-B of the user (e.g., for provider B) and information 685-B associated with a historical-based SBS from MSP 220. Self-service portal 220-B may generate a historical-based SBS 690-B based on information 685-B, and may provide credentials 625-B and historical-based SBS 690-B to provisioning system 230-B. Provisioning system 230-B may generate commands 695-B that include information associated with updating bandwidth requirements for the user based on historical-based SBS 690-B, and may provide commands 695-B to network 260-B. One or more network resources of network 260-B may utilize commands 695-B to update the bandwidth requirements (e.g., by increasing or decreasing a CAR, a burst rate, a LPS, or the like) for the user.

In some implementations, procedures used to create user-defined SBSs and profile-based SBSs may be same for MSP 220 and self-service portals 220 of the providers. However, procedures used to create historical-based SBSs may be different for MSP 220 and self-service portal 220. For example, MSP 220 may build historical-based SBSs for user circuits by interacting with each providers' self-service portal 220 (e.g., using screen scrapping techniques, application programming interfaces (APIs), web services, or the like) in order to collect network usage statistics for the user circuits over a time period of time. In some implementations, MSP 220 may collect the usage statistics from self-service portals 220 on daily or weekly basis. In some implementations, MSP 220 may collect historical network usage statistics for the user circuits for a number of months (e.g., up to twelve months) from self-service portals 220.

In some implementations, MSP 220 may create a historical-based SBS for a user in the following manner. MSP 220 may receive user credentials for multiple providers, and may open a secure login session with each provider's self-service portal 220 based on the user credentials. MSP 220 may request particular information from each provider's self-service portal 220, such as information associated with circuits utilized by the user, network usage statistics for the user, usage history for the user, or the like. Each provider's self-service portal 220 may request the particular information from each provider's provisioning system 230, and may receive the particular information from each provider's provisioning system 230. Each provider's self-service portal 220 may forward the particular information to MSP 220. MSP 220 may receive the particular information, parse the particular information, and store the parsed information, along with user account numbers, circuit identifiers, bandwidth history details, or the like, in a data structure (e.g., a database). MSP 220 may utilize a minimal interval provided by the user, and the historical network usage information (e.g., stored in the data structure) to create historical-based SBSs associated with each of the user's circuits.

As further shown in FIG. 6G, self-service portal 220-C may receive credentials 625-C of the user (e.g., for provider C) and information 685-C associated with a profile-based SBS from MSP 220. Self-service portal 220-C may generate a profile-based SBS 690-C based on information 685-C, and may provide credentials 625-C and profile-based SBS 690-C to provisioning system 230-C. Provisioning system 230-C may generate commands 695-C that include information associated with updating bandwidth requirements for the user based on profile-based SBS 690-C, and may provide commands 695-C to network 260-C. One or more network resources of network 260-C may utilize commands 695-C to update the bandwidth requirements (e.g., by increasing or decreasing a CAR, a burst rate, a LPS, or the like) for the user.

As indicated above, FIGS. 6A-6G are provided merely as an example. Other examples are possible and may differ from what was described with regard to FIGS. 6A-6G. In some implementations, the various operations described in connection with FIGS. 6A-6G may be performed automatically or at the request of a user.

Systems and/or methods, described herein, may provide an automated bandwidth management process that enables a user to specify a bandwidth schedule one time, and that automatically implements the bandwidth schedule without further user intervention. The systems and/or methods may enable the user to continue to make bandwidth changes from the self-service portal if desired, may automatically implement bandwidth changes for the users without further user intervention, and may provide cost savings to the user based on optimum bandwidth usage. The systems and/or methods may enable network service providers to save costs associated with manual bandwidth changes, to provide an improved user experience, and to minimize loss of unsatisfied users.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like), and/or may not be user-configurable. Information associated with the user interfaces may be selected and/or manipulated by a user (e.g., via a touch screen display, a mouse, a keyboard, a keypad, voice commands, or the like). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms.

Further, the phrase "based on" is intended to mean "based, at least in part, on" unless explicitly stated otherwise.

What is claimed is:

1. A method, comprising:
enabling, by a device, automated bandwidth on demand functionality for a user device, associated with a network, based on an instruction to enable the automated bandwidth on demand functionality;
receiving, by the device and from the user device associated with a user, a segmented bandwidth schedule for the user device and for the automated bandwidth on demand functionality,
the segmented bandwidth schedule including a schedule of particular bandwidth requirements to be implemented for the user device at particular times, and
the segmented bandwidth schedule including:
information indicating a committed access rate (CAR), for the user device and of the network, for each of the particular times,
information indicating a burst rate, for the user device and of the network, for each of the particular times,
information indicating a logical port speed (LPS), for the user device and of the network, for each of particular times, and
information indicating a quality of service (QoS), for the user device and of the network, for each of the particular times;
generating, by the device, one or more provisioning commands that cause a first particular bandwidth requirement, of the particular bandwidth requirements, to be implemented in the network, for the user device, and at a first particular time, of the particular times, based on the segmented bandwidth schedule; and
providing, by the device, the one or more provisioning commands to one or more network resources of the network,
the one or more provisioning commands causing the one or more network resources of the network to implement the first particular bandwidth requirement in the network, for the user device, and at the first particular time.

2. The method of claim 1, further comprising:
providing the first particular bandwidth requirement to at least one of an order management system or a billing system associated with the network.

3. The method of claim 1, further comprising:
providing, for display, a user interface that instructs the user to select one of a user-specified schedule, a historical-based schedule, or a profile-based schedule;
receiving, via the user interface, information associated with a selection of one of the user-specified schedule, the historical-based schedule, or the profile-based schedule as the segmented bandwidth schedule; and
receiving further information, from the user device, based on the information associated with the selection and in order to generate the segmented bandwidth schedule.

4. The method of claim 3, where, when the information associated with the selection includes the user-specified schedule, the method further comprises:
providing, for display, another user interface that instructs the user to provide entries for the user-specified schedule;
receiving, via the other user interface, the entries for the user-specified schedule; and
generating the user-specified schedule based on the entries.

5. The method of claim 3, where, when the information associated with the selection includes the historical-based schedule, the method further comprises:
providing, for display, another user interface that instructs the user to provide information identifying an interval for the historical-based schedule;
receiving, via the other user interface, the information identifying the interval for the historical-based schedule;
receiving historical usage data, of the network, by the user device; and
generating the historical-based schedule based on the information identifying the interval and the historical usage data.

6. The method of claim 3, where, when information associated with the selection includes the profile-based schedule, the method further comprises:
providing, for display, another user interface that instructs the user to provide profile information, associated with the user, for the profile-based schedule;
receiving, via the other user interface, the profile information for the profile-based schedule;
generating a profile for the user based on the profile information; and
generating the profile-based schedule based on the profile.

7. The method of claim 1, where the one or more network resources use the one or more provisioning commands to modify the CAR, the burst rate, the LPS, or the QoS of the network.

8. A device, comprising:
one or more processors to:
enable automated bandwidth on demand functionality for a user, associated with a network, based on an instruction to enable the automated bandwidth on demand functionality;
receive a segmented bandwidth schedule for the user and for the automated bandwidth on demand functionality,
the segmented bandwidth schedule specifying a schedule of particular bandwidth requirements to be implemented for the user at one or more time periods, and
the segmented bandwidth schedule including:
information indicating a committed access rate (CAR), for the user and of the network, for each of the one or more time periods,
information indicating a burst rate, for the user and of the network, for each of the one or more time periods,
information indicating a logical port speed (LPS), for the user and of the network, for each of the one or more time periods, and
information indicating a quality of service (QoS), for the user and of the network, for each of the one or more time periods;
generate one or more provisioning commands that cause a first particular bandwidth requirement, of the schedule of particular bandwidth requirements, to be implemented in the network, for the user, and at a first particular time period, of the one or more time periods, based on the segmented bandwidth schedule; and
provide the one or more provisioning commands to one or more network resources of the network, the one or more provisioning commands causing the one or more network resources of the network to implement the first particular bandwidth requirement in the network, for the user, and at the first particular time period according to the segmented bandwidth schedule.

9. The device of claim 8, where the one or more processors are further to:
provide the first particular bandwidth requirement to one or more systems associated with the network.

10. The device of claim 8, where the one or more processors are further to:
receive information associated with a selection of one of a user-specified schedule, a historical-based schedule, or a profile-based schedule, as the segmented bandwidth schedule; and
receive additional information from the user, based on the information associated with the selection and in order to generate the segmented bandwidth schedule.

11. The device of claim 10, where, when the information associated with the selection includes the user-specified schedule, the one or more processors are further to:
receive entries for the user-specified schedule; and
generate the user-specified schedule based on the entries.

12. The device of claim 10, where, when the information associated with the selection includes the historical-based schedule, the one or more processors are further to:
receive information identifying an interval for the historical-based schedule;
receive historical usage data of the network, by the user; and
generate the historical-based schedule based on the information identifying the interval and the historical usage data.

13. The device of claim 10, where, when the information associated with the selection includes the profile-based schedule, the one or more processors are further to:
receive profile information, associated with the user, for the profile-based schedule;
generate or identify a profile for the user based on the profile information; and
generate the profile-based schedule based on the profile.

14. The device of claim 8, where the segmented bandwidth schedule is stored in a data structure that includes:
a CAR field for storing the information indicating the CAR,
a burst rate field for storing the information indicating the burst rate,
a LPS field for storing the information indicating the LPS, and
a QoS field for storing the information indicating the QoS.

15. A non-transitory computer-readable medium for storing instructions, the instructions comprising:
one or more instructions that, when executed by one or more processors of a device, cause the one or more processors to:
enable automated bandwidth on demand functionality for a user, associated with a plurality of networks, based on an instruction to enable the automated bandwidth on demand functionality;
receive a plurality of segmented bandwidth schedules for the user and for the automated bandwidth on demand functionality,
each of the plurality of segmented bandwidth schedules specifying a schedule of particular bandwidth requirements to be implemented for the user at one or more time periods, and
each of the plurality of segmented bandwidth schedules including:
information indicating a committed access rate (CAR), for the user and of a corresponding one of the plurality of networks, for each of the one or more time periods,
information indicating a burst rate, for the user and of the corresponding one of the plurality of networks, for each of the one or more time periods,
information indicating a logical port speed (LPS), for the user and of the corresponding one of the plurality of networks, for each of the one or more time periods, and
information indicating a quality of service (QoS), for the user and of the corresponding one of the plurality of networks, for each of the one or more time periods;
generate, for each of the plurality of networks, a set of one or more provisioning commands that cause a first particular bandwidth requirement, of the schedule of particular bandwidth requirements, to be implemented in one of the plurality of networks, for the user, and at a first particular time period, of the one or more time periods, based on the plurality of segmented bandwidth schedules; and
provide each set of the one or more provisioning commands to the corresponding one of the plurality of networks,
each set of the one or more provisioning commands causing a corresponding one of the plurality of networks to implement the first particular bandwidth requirement in the corresponding one of the plurality of networks, for the user, based on a corresponding one of the plurality of segmented bandwidth schedules.

16. The non-transitory computer-readable medium of claim 15, where each of the plurality of segmented bandwidth schedules includes one of:
a user-specified schedule,
a historical-based schedule, or
a profile-based schedule.

17. The non-transitory computer-readable medium of claim 16, where the user-specified schedule includes bandwidth requirement entries provided by the user.

18. The non-transitory computer-readable medium of claim 16, where the historical-based schedule is generated based on historical usage data, of the user, on a corresponding one of the plurality of networks.

19. The non-transitory computer-readable medium of claim 16, where the profile-based schedule is generated based on an intended use of one of the plurality of networks by the user.

20. The non-transitory computer-readable medium of claim 15, where each of the plurality of segmented bandwidth schedules is stored in a data structure that includes:
a CAR field for storing the information indicating the CAR,
a burst rate field for storing the information indicating the burst rate,
a LPS field for storing the information indicating the LPS, and
a QoS field for storing the information indicating the QoS.

* * * * *